(12) United States Patent
Rossato et al.

(10) Patent No.: US 8,948,248 B2
(45) Date of Patent: Feb. 3, 2015

(54) TIERED SIGNAL DECODING AND SIGNAL RECONSTRUCTION

(76) Inventors: Luca Rossato, Milan (IT); Guido Meardi, Milan (IT)

( * ) Notice: Subject to any disclaimer, the term of this patent is extended or adjusted under 35 U.S.C. 154(b) by 608 days.

(21) Appl. No.: 13/188,201

(22) Filed: Jul. 21, 2011

(65) Prior Publication Data

US 2013/0294495 A1     Nov. 7, 2013

(51) Int. Cl.
| | | |
|---|---|---|
| H04N 7/12 | (2006.01) | |
| H04N 11/02 | (2006.01) | |
| H04N 11/04 | (2006.01) | |
| H04B 1/66 | (2006.01) | |
| H04N 7/01 | (2006.01) | |
| G09G 5/00 | (2006.01) | |

(52) U.S. Cl.
CPC ................................ *H04N 7/12* (2013.01)
USPC ............ 375/240.01; 375/240.26; 375/240.02; 375/240.25; 345/629; 348/448

(58) Field of Classification Search
USPC .......................................................... 375/240
See application file for complete search history.

(56) References Cited

U.S. PATENT DOCUMENTS

| | | | |
|---|---|---|---|
| 6,469,710 B1 * | 10/2002 | Shum et al. ................ | 345/619 |
| 6,618,443 B1 | 9/2003 | Kim et al. | |
| 7,379,496 B2 * | 5/2008 | Holcomb et al. ........ | 375/240.03 |
| 7,701,509 B2 * | 4/2010 | Liu et al. ................ | 348/452 |
| 2003/0081838 A1 | 5/2003 | Teng | |
| 2004/0151401 A1 * | 8/2004 | Sawhney et al. ........... | 382/299 |
| 2006/0053004 A1 * | 3/2006 | Ceperkovic et al. .......... | 704/221 |
| 2006/0071825 A1 | 4/2006 | Demos | |
| 2007/0247547 A1 * | 10/2007 | Liu et al. ................ | 348/458 |
| 2008/0165848 A1 * | 7/2008 | Ye et al. ................ | 375/240.13 |
| 2010/0008417 A1 * | 1/2010 | Xu et al. ................ | 375/240.02 |

(Continued)

FOREIGN PATENT DOCUMENTS

| | | |
|---|---|---|
| RU | 02337503 C1 | 10/2008 |
| RU | 02387094 C1 | 4/2010 |

(Continued)

OTHER PUBLICATIONS

Kim, Yong-Hwan et al., "Fast and Memory-Efficient Up-Sampling Methods for H.264/AVC SVC with Extended Spatial Scalability", IEEE Transactions on Consumer Electronics, May 2010, Total pp. 9, vol. 56 No. 2, IEEE, New York.

(Continued)

*Primary Examiner* — Joseph Ustaris
*Assistant Examiner* — Talha Nawaz
(74) *Attorney, Agent, or Firm* — Chapin IP Law, LLC

(57) ABSTRACT

A decoder decodes a first set of data and utilizes the first set of decoded data to reconstruct the signal according to a first level of quality. The decoder further decodes a second set of data and identifies an upsample operation specified by the second set of decoded data. The decoder applies the upsample operation identified in the second set of decoded data to the reconstructed signal at the first level of quality to reconstruct the signal at a second, higher level of quality. To enhance the reconstructed signal, the decoder retrieves residual data from the second set of decoded data. The residual data indicates how to modify the reconstructed signal at the second level of quality subsequent to application of the upsampling operation as discussed above. The decoder then modifies the reconstructed signal at the second level of quality as specified by the residual data.

42 Claims, 11 Drawing Sheets

(56) References Cited

U.S. PATENT DOCUMENTS

| | | | |
|---|---|---|---|
| 2010/0020866 A1* | 1/2010 | Marpe et al. | 375/240.02 |
| 2011/0243471 A1* | 10/2011 | Alshina et al. | 382/248 |
| 2012/0195376 A1* | 8/2012 | Wu et al. | 375/240.12 |
| 2012/0213296 A1* | 8/2012 | Sun | 375/240.29 |

FOREIGN PATENT DOCUMENTS

| | | |
|---|---|---|
| WO | 2006043755 | 8/2006 |
| WO | 2006108654 | 10/2006 |
| WO | 2006108654 A2 | 10/2006 |
| WO | 2007032239 | 3/2007 |
| WO | 2008056959 | 5/2008 |

OTHER PUBLICATIONS

Reichel, Julien, "Joint Scalable Video Model JSVM-12", Oct. 21-26, 2007, Total pp. 114, JVT, China.

Mansour, Hassan et al., "Rate and Distortion Modeling of CGS Coded Scalable Video Content", IEEE Transactions on Multimedia, Apr. 2011, Total pp. 16, vol. 13 No. 2, IEEE, New York.

Li, Shipeng et al., "Experimental Results with Progressive Fine Granularity Scalable (PFGS) Coding", Coding of Moving Pictures and Audio, Mar. 2000, Total pp. 14, Microsoft Research China, China.

Ammar, Nejib et al., "Switched SVC Up-sampling Filter", Proposal, Jan. 14-20, 2006, Total pp. 6, Nokia Research Center, Thailand.

Segall, Andrew, "Study of Upsampling/Down-sampling for Spatial Scalability", Proposal, Oct. 14-21, 2005, Total pp. 18, Sharp Labs of America, France.

International Search Report from corresponding PCT application No. PCT/IB2012/053722, mailed Mar. 19, 2013, Total pp. 7.

Search Report, Application No. 201490312, Dated: Aug. 5, 2014, pp. 1.

* cited by examiner

TIERED SIGNAL DECODING AND SIGNAL RECONSTRUCTION

RELATED APPLICATIONS

This application is related to U.S. patent application Ser. No. 13/188,188 entitled "INHERITANCE IN A TIERED SIGNAL QUALITY HIERARCHY," filed on the same day as the present application, the entire teachings of which are incorporated herein by this reference.

This application is related to U.S. patent application Ser. No. 13/188,207 entitled "SIGNAL PROCESSING AND TIERED SIGNAL ENCODING," filed on the same day as the present application, the entire teachings of which are incorporated herein by this reference.

This application is related to U.S. patent application Ser. No. 13/188,220 entitled "UPSAMPLING IN A TIERED SIGNAL QUALITY HIERARCHY," filed on the same day as the present application, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on the same day as the present application, the entire teachings of which are incorporated herein by this reference.

This application is related to U.S. patent application Ser. No. 13/188,237 entitled "TRANSMISSION OF RECONSTRUCTION DATA IN A TIERED SIGNAL QUALITY HIERARCHY," filed on the same day as the present application, the entire teachings of which are incorporated herein by this reference.

BACKGROUND

CPU (Central Processing Unit) efficiency matters both during encoding and decoding of a signal. Latest generation processors are becoming more and more parallel, with up to hundreds of simple cores on each single chip.

Unfortunately, by nature, traditional MPEG (Moving Pictures Expert Group) family codecs are structurally non-parallel. That stems from the fact that they are block-based, and each image block must be encoded and decoded sequentially, since to achieve efficient compression all blocks must be made to depend in some way on each other.

Via the introduction of so-called "slices" (basically, pieces of the image that are treated independently of one another, as if they were separate videos put one next to the other) into MPEG coding, the H.264 standard allows for processing of a few threads in parallel (typically 2 or 3 threads). Important algorithm elements such as de-blocking (i.e., a filter that "smoothes" the transitions among blocks to create a more uniform image) are typically global operations full of conditional instructions, which are unsuitable for applications including parallel CPUs.

Today's CPUs and GPUs (Graphics Processing Units) are typically very powerful; a single GPU can include several hundreds of computing cores to perform parallel processing of information. When using current technology, larger portions of an image can be stored in a processor cache for processing. The need to fragment images into a multitude of small blocks, which was a driving factor when MPEG was created, as processors from that era could only deal with very small chunks of video data at a time—and then only sequentially—no longer applies to modern CPUs and GPUs. Thus, a large portion of available processing power may go unused when implementing MPEG-like types of encoding/decoding, with blocking artifacts needlessly introduced into the signal.

Also, compared to what was current when MPEG was developed, modern day applications typically require much higher definition video encoding and much higher overall playback quality. In high-definition (HD), high-quality videos, there is a much larger difference between areas with low detail (potentially even out of focus) and areas with very fine detail. This makes the use of frequency-domain transforms such as those used in MPEG even more unsuitable for image processing and playback, since the range of relevant frequencies is getting much broader.

In addition, higher resolution images include a higher amount of camera noise and/or film grain, i.e., very detailed high-frequency pixel transitions that can be quite irrelevant for viewing and require many bits to encode.

Lastly, traditional codecs are ill-suited to perform efficiently with 3D or volumetric imaging, which is becoming more and more important in fields such as medical imaging, scientific imaging, etc.

Most target devices today support different playback resolutions and quality. So-called SVC (Scalable Video Coding), the current MPEG standard for scalability, has not been received favorably by the industry and shows little to non-existent adoption, because it is considered way too complex and somewhat bandwidth inefficient.

Moreover, encoded videos are plentiful; that is, a content provider typically doesn't have the time to customize encoder parameters and experiment with each specific video stream. Currently, content providers dislike that many encoding parameters must be manually tweaked (every time performing an encoding and checking the quality of results) in order to successfully encode a video.

As an alternative to MPEG standards for encoding/decoding, so-called image pyramids have been used for encoding/decoding purposes. For example, using Laplacian pyramids, conventional systems have created lower resolution images using Gaussian filters and then building the pyramid of the differences between the images obtained by upsampling with a rigidly programmed decoder back from the lower resolution levels to the original level.

Use of conventional Laplacian pyramid encoding has been abandoned. One deficiency of such transforms is that the authors were always trying to avoid distortions/artifacts in the downsampled image, so they always used Gaussian filtering, as it is the only type of filter that doesn't add any information of its own. However, the insurmountable problem with Gaussian filtering is that it introduces a blurring effect, such that when upscaling back to larger resolutions, there is a need for an inordinate amount of image correction information to reproduce the original image.

BRIEF DESCRIPTION

Embodiments herein deviate with respect to conventional systems and methods. For example, embodiments herein are directed to unique ways of processing and reproducing signals such as image information and other types of encoded information.

More specifically, one embodiment herein includes reconstructing a signal at successively higher levels of quality in a hierarchy. For example, according to one embodiment, a decoder decodes a first set of data and utilizes the first set of decoded data to reconstruct the signal according to a first level of quality. The decoder decodes a second set of data and identifies an upsample operation specified by the second set of decoded data, together with a scale factor also specified by the second set of decoded data. The decoder then applies the upsample operation and the scale factor identified in the second set of decoded data to the reconstructed signal at the first level of quality to reconstruct the signal at a second level of quality. In this example, the second level of quality is higher in quality than the first level of quality. In this manner, a set of decoded data indicates how to perform upsampling from one tier to the next.

In accordance with further embodiments, to enhance the reconstructed signal at a respective level of quality, the decoder also can be configured to retrieve residual data from the second set of decoded data. The residual data can indicate how to modify the reconstructed signal at the second level of quality subsequent to application of the upsampling operation as discussed above. The decoder modifies the reconstructed signal at the second level of quality as specified by the residual data.

The decoder can repeat the above processing for each of multiple levels of quality in the hierarchy. For example, for each of multiple levels of quality above the second level of quality, the decoder repeats steps of: decoding a next higher set of data in the hierarchy above a last processed level of quality; identifying an upsample operation and a scale factor specified by the next higher set of decoded data; applying the upsample operation and the scale factor identified in the next higher set of decoded data to reconstruct the signal at a next higher level of quality; identifying residual information and/or residual characteristics specified by the next higher set of decoded data; applying the residual information to modify the reconstructed signal at the next higher level of quality.

Note that the signal as discussed herein can be of any suitable type, including 2D pictures, video frames, motion vector maps, 3D/volumetric images etc. For this reason, in the document we will refer to the basic elements of the signal at a given resolution as "signal elements" or "plane elements" ("pels"): each pel represents a value on a regular grid in a multidimensional space. For 2D images, pels are also commonly called "pixels" (picture elements), while for 3D images pels are also called "voxels" (volumetric picture elements). The resolution of the signal defines the number of pels that are present for each dimension of the grid. The signal as discussed herein can also represent just one of the planes/components of a more complex signal featuring several planes/components (e.g., luminance and chrominance, RGB, HSV, etc.). In one embodiment, the signal includes image data to reconstruct an image. In accordance with such an embodiment, the decoder reconstructs the signal at yet higher resolutions or higher levels of quality based on the tiered sets of encoded data to eventually reconstruct an original image or a near copy of the original image for playback. In certain cases, a lower level of quality image (e.g., a reconstructed signal at level lower than the highest possible resolution in the hierarchy) can be displayed for viewing, for instance when the output device is unable to display the full original resolution or when bandwidth for transmission is limited.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments.

In addition to the decoder and processing as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations. For example, in one embodiment, the instructions, when carried out by a processor of a respective computer device, cause the processor to: decode a first set of data; utilize the first set of decoded data to reconstruct the signal according to a first level of quality; decode a second set of data; identify an upsample operation and a scale factor specified by the second set of decoded data; and apply the up sample operation and scale factor identified in the second set of decoded data to the reconstructed signal at the first level of quality to reconstruct the signal at a second level of quality, the second level of quality being higher than the first level of quality.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed above, by way of a non-limiting example, a decoder decodes a first set of data and utilizes the first set of decoded data to reconstruct the signal according to a first level of quality. The decoder further decodes a second set of data and identifies an upsample operation, together with a scale factor, specified by the second set of decoded data. The decoder then applies the upsample operation and scale factor identified in the second set of decoded data to the reconstructed signal at the first level of quality to reconstruct the signal at a second, higher level of quality. To enhance the reconstructed signal, the decoder retrieves residual data from the second set of decoded data. The residual data indicates how to modify the reconstructed signal at the second level of quality subsequent to application of the upsampling operation and scale factor as discussed above. The decoder then modifies the reconstructed signal at the second level of quality as specified by the residual data. The decoder can be configured to repeat this process of reconstructing a signal at yet higher levels of quality.

Figure 1:
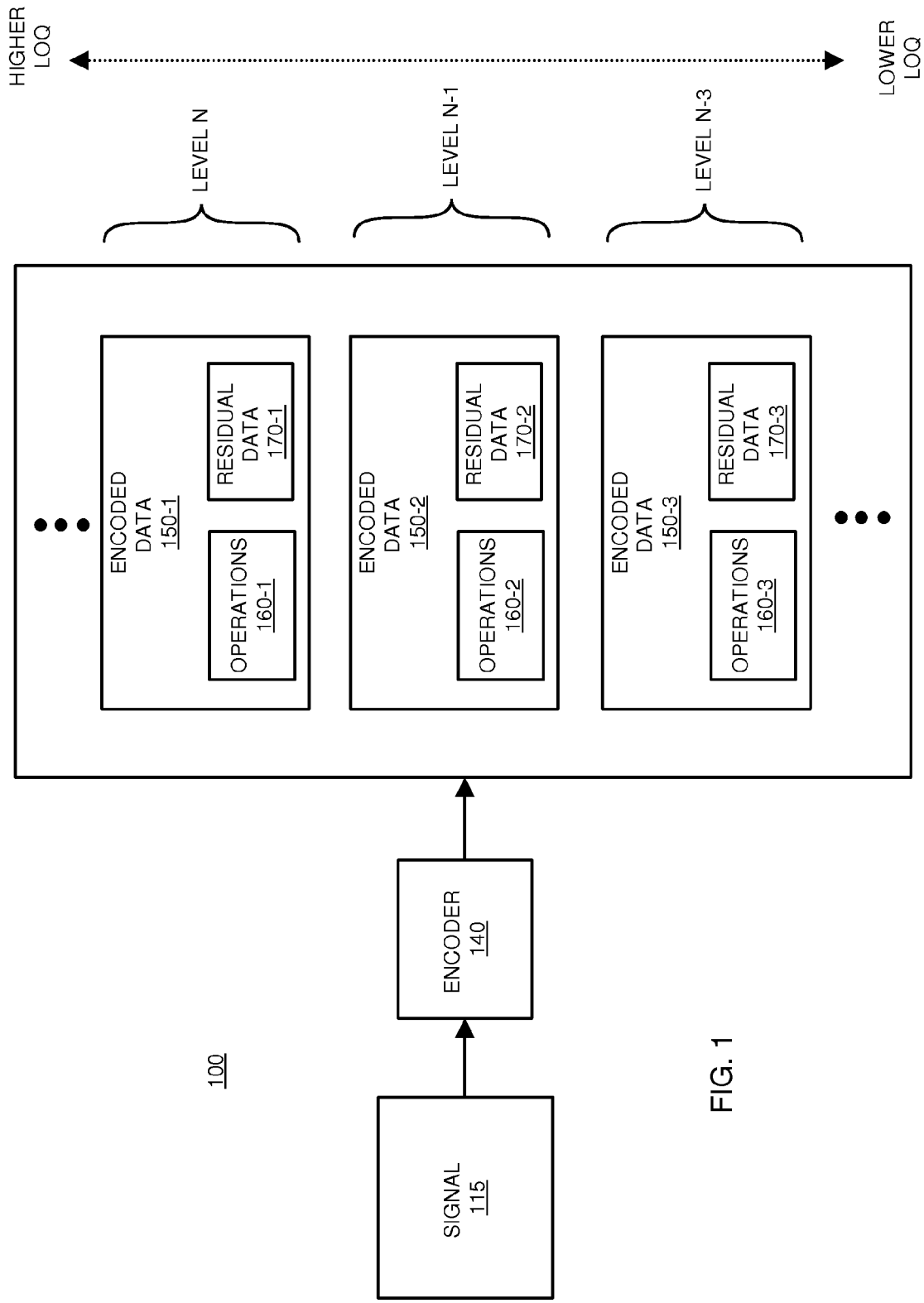
FIG. 1 is an example diagram of an encoder and corresponding encoded data according to embodiments herein.

FIG. 1 is an example diagram illustrating an encoder and generation of corresponding sets of encoded data according to embodiments herein.

During operation, the encoder 140 in encoding environment 100 processes signal 115 to produce encoded data 150. Note that the signal 115 encoded by the encoder 140 can be any suitable type of data information.

By way of a non-limiting example, the signal 115 can be image data, symbols, etc., indicating settings of each of multiple signal elements (e.g., pels/plane elements, pixels/picture elements, voxels/volumetric picture elements, etc.) in a respective image. As already mentioned, the image can be two dimensional (e.g., pictures, video frames, 2D motion maps, etc.), three dimensional (e.g., 3D/volumetric images, holographic images, CAT-scans, medical/scientific images, 3D motion maps, etc.) or even featuring more than three dimensions. In accordance with such an embodiment, the settings of the signal elements (as specified by the signal 115) indicate how to reconstruct the respective image for playback on a device.

Encoded data 150 produced by encoder 140 includes a hierarchy of encoded data including set of encoded data 150-1, set of encoded data 150-2, set of encoded data 150-3, and so on.

In general, each set of encoded data at a respective level of quality in the hierarchy defines how to reconstruct a signal for the respective level of quality, and is also the basis for reconstructing the signal at higher levels of quality. As discussed below, reconstruction of the signal 115 at a respective level of quality using a set of encoded data can depend on reconstruction of the signal at a next lower level of quality.

More specifically, in accordance with one embodiment, each set of encoded data 150 includes a respective set of one or more operations and/or respective residual data for reconstructing at a particular level of quality. For example, set of encoded data 150-1 can include one or more operations 160-1 and residual data 170-1; set of encoded data 150-2 can include one or more operations 160-2 and residual data 170-2; set of encoded data 150-3 can include one or more operations 160-3 and residual data 170-3, and so on.

To produce the sets of encoded data 150, the encoder 140 applies downsampling operations to reduce a received signal 115 into lower levels of quality. For example, the encoder reduces original image information into a lower resolution image information in the hierarchy. The encoded data 150 produced by the encoder 140 indicates how to reconstruct the signal 115 at a lower level of quality into a signal at a next higher level of quality. The encoder 140 repeats the process at each successive lower resolution or level of quality in the hierarchy. Additional details associated with encoding of data with encoder 140 can be found in related U.S. patent application Ser. No. 13/188,207, and entitled "SIGNAL PROCESSING AND TIERED SIGNAL ENCODING," filed on the same day as the present application, the entire teachings of which are incorporated herein by this reference.

As previously mentioned, in addition to specifying one or more operations, the encoded data 150 can include residual data 170. In one embodiment, the residual data for a given level specifies how to modify the reconstructed signal at a respective level of quality. Modification of the reconstructed signal at a given level of quality can be performed to enhance the accuracy of the reconstructed signal, place the reconstructed signal in a better form for subsequent upsampling at higher levels of quality, etc. Note that a set of encoded data may optionally not include any residual data, or any operations. In such cases, the decoder executes the upsample operations and the reconstruction of the signal at a higher level of quality based on default parameters established when reconstructing the previous levels of quality.

In one embodiment, as will be discussed later in this specification, a lowest level of encoded data in the hierarchy can be used to produce a starting point for reconstructing a respective higher level of quality of the signal 115. The next level of encoded data (just above the lowest level of quality) can be applied to the reconstructed signal at the lowest level of quality to produce a higher signal quality. Applying each set of data at a successively higher level in the hierarchy can produce a yet higher and higher resolution image.

Note that inclusion of a respective set of one or more image operations 160 and/or residual data 170 is shown by way of non-limiting example only and that a respective set of encoded data 150 at a particular level in the hierarchy may not specify any operations 160 or include any residual data 170.

Figure 2:
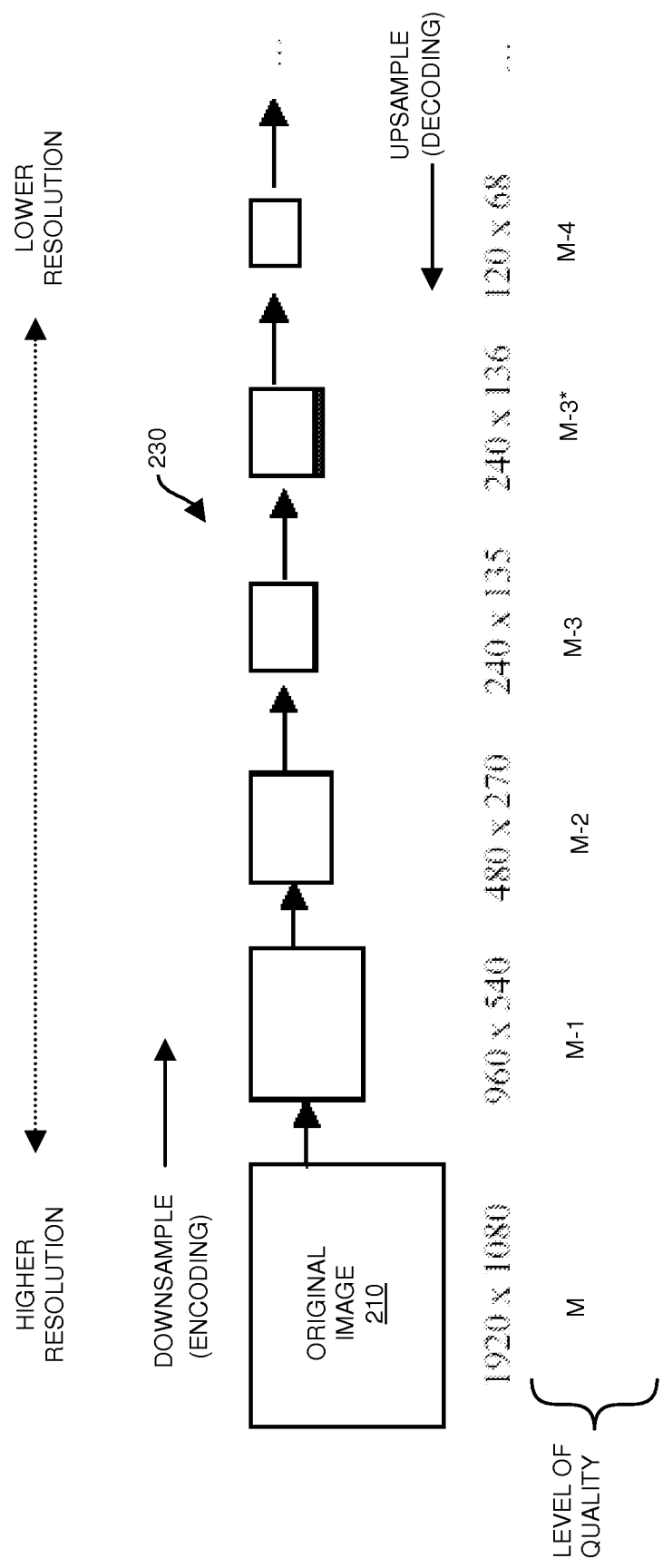
FIG. 2 is an example diagram illustrating a process of encoding and decoding a signal according to embodiments herein.

FIG. 2 is an example diagram illustrating a process of encoding according to embodiments herein. In this example, assume that the original image 210 in FIG. 2 is defined by signal 115. That is, the signal 115 indicates how to set each image element in a group of multiple image elements (e.g., 1920×1080 image elements).

During encoding of the original image 210, the encoder 140 performs a downsampling operation at level M to produce the next lower resolution image in the hierarchy at level M−1 as shown; based on the image at level M−1, the encoder 140 performs another downsampling operation at level M−1 to produce the next lower resolution image in the hierarchy at level M−2; and so on.

As previously discussed, at each respective level of quality, the encoder 140 produces a respective set of encoded data to convert a lower resolution or lower level of quality signal to a next higher resolution or quality signal.

In accordance with one embodiment, the encoder 140 downsamples from one level of quality to the next based on a desired scale factor. For example, by way of a non-limiting example, FIG. 2 illustrates a technique of implementing a scale factor of 2:1 to obtain the next lower level resolution from level M to Level M−1; from level M−1 to level M−2; etc. In this example, based on a 2:1 scale factor, each dimension of the signal from one level of quality to the next lower level of quality is undersampled by a factor of 2. At each successively lower level, the encoder 140 reduces a resolution of A×B to a resolution of A/2×B/2, to a resolution of A/4×B/4, etc.

Note that the encoder 140 can be configured to dynamically change the scale factor from one level of quality to the next in order to make encoding and/or decoding more efficient. The scale factor information for each of the levels of quality can be stored in respective sets of encoded data.

In one embodiment, each color component of image elements is codified separately based on a color space standard such as YUV, RGB or HSV, although the attributes of the signal 115, when defining an image, can be encoded according to any suitable format.

In order to allow for the necessary downsampling to successively lower levels of quality, new image elements can be added or removed at a respective level of quality as needed. For example, addition of image elements can include replicating or mirroring borders of an image to adjust the image to an appropriate sized field of viewable elements. In the case of a video signal, and a 2:1 scale factor, for instance, downsampling tends to work well with images that have respective horizontal and vertical sizes that scale easily based on the power of 2.

To facilitate downsampling, as shown at level of quality M−3 and M−3*, the encoder 140 can adjust the resolution dimensions at each level by adding or deleting rows or columns of image elements as needed such that the image can be scaled easily from one level to the next.

More specifically, in one embodiment, to adjust the resolution of the donwsampled image, the encoder 140 adds rows and/or columns (depending on which dimension needs to be adjusted) by duplicating or mirroring a row or column and copying the row or column at or around a perimeter location of the image as shown. In one embodiment, during downsampling, a border row (such as a bottommost row) of image elements at level M−3 can be copied or mirrored and added to the bottom row of level M−3 to produce the image for level M−3* to change its dimensions. The image at level M−3* can then be downsampled further to level M−4 based on a power of 2. That is, an image at level M−3* can be downsampled from 240 image elements×136 image elements to level M−4 having dimensions of 120 image elements×68 image elements.

Figure 3:
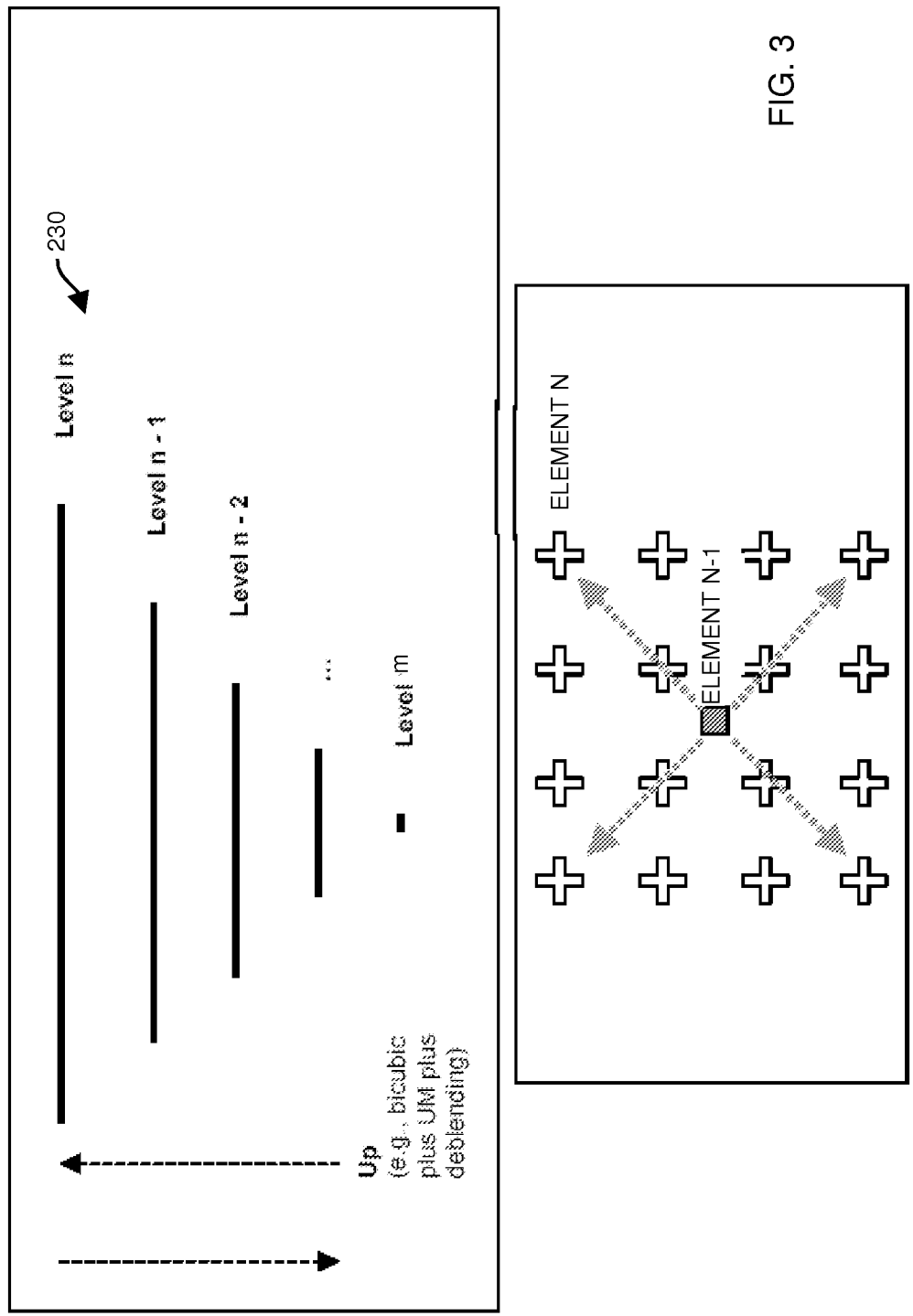
FIG. 3 is an example diagram illustrating expansion of a signal including image information at different levels of quality in a hierarchy according to embodiments herein.

FIG. 3 is an example diagram illustrating expansion of image elements at different levels according to embodiments herein.

Higher levels of quality in the hierarchy 230 are reconstructed by upsampling lower levels (using specific operations, described later) and by decoding the necessary residuals (encoded and transmitted with operations described later). In one embodiment, it is not necessary that the kernel/operation used to upsample (e.g., on the decoding side) is of the same kind of the kernel/operation used to downsample (e.g., on the encoding side). Also, it is not necessary that the operation used to obtain the lower levels is even a filter (linear or non-linear): it may actually be a combination of techniques. In other words, the encoding and respective decoding process as discussed herein may be asymmetrical. In one embodiment, the signal 115 is encoded with one or more operations at each level of quality so as to reduce an entropy of respective residual data that are applied after upsampling as will be discussed later in this specification. This may reduce an amount of data that is needed to reconstruct the original signal 115.

In accordance with one embodiment, lower levels of quality are obtained from higher levels (downward path) using a tweaked bilinear filter (which from experiments seems to be one of the kernels/operations that best preserve the information, even if the resulting signal is not "the best to look at"). In other words, a reconstructed signal 115 may not be a perfect reproduction of an original image at a lower resolution. The encoded signal 115 at lower levels of quality in the hierarchy can include artifacts.

In one embodiment, results of applying a bilinear filter during encoding are tweaked so as to minimize the entropy of residuals when we upsample back to higher levels. Reducing the entropy of residual data for one or more of the levels of quality can reduce an overall amount of data that is needed to reconstruct the signal at a high level of quality. In one embodiment, the encoding/decoding is lossy to some extent. However, reconstruction of the signal using the encoded data can be a near perfect replica of an original version of the signal 115. Additional details associated with encoding of data with encoder 140 can be found in related U.S. patent application Ser. No. 13/188,207, and entitled "SIGNAL PROCESSING AND TIERED SIGNAL ENCODING," filed on the same day as the present application, the entire teachings of which are incorporated herein by this reference.

In one embodiment, the reconstruction of the signal 115 at higher levels from lower levels includes leveraging a combination of one or more upsample methods such as bicubic filter operations, unsharp masking filter operations, deblending filter operations, etc. For example, during encoding, the encoder 140 can specify one or more operations that are to be included in a respective set of encoded data that are to be used for upsampling a reconstructed signal from one level of quality to the next during the decode process. For a respective level, and if necessary for each signal element, the encoder 140 can select none, one or more upsample operations (e.g., a bicubic filter operation, a deblending filter, an unsharp masking filter, etc.) to be applied by the decoder to the reconstructed signal at each of the levels of quality in the hierarchy.

Figure 4:
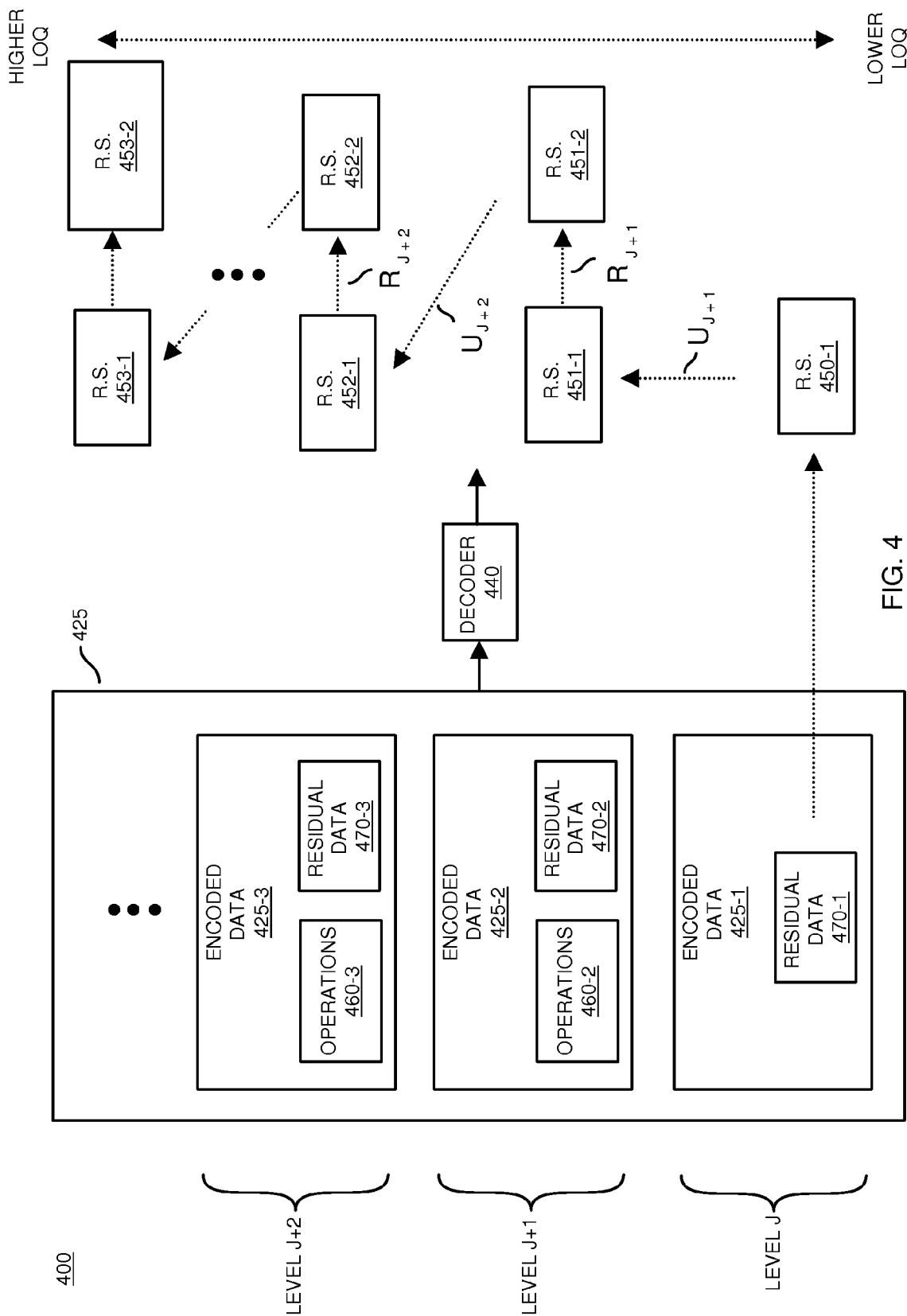
FIG. 4 is an example diagram illustrating decoding and reconstructing a signal according to embodiments herein.

FIG. 4 is an example diagram illustrating decoding of encoded data to reconstruct a signal at different levels of quality according to embodiments herein.

In a manner as previously discussed, the encoder 140 produces the set of encoded data 425 to reconstruct a respective signal 115. As shown, set of encoded data 425-1 includes a set of residual data 470-1; set of encoded data 425-2 includes operations 460-2 and residual data 470-2; set of encoded data 425-3 includes operations 460-3 and residual data 470-3; and so on up the hierarchy.

As shown, the decoder 440 in decoding environment 400 utilizes the hierarchical sets of encoded data 425 to reconstruct a respective signal 115 at different levels of quality. As previously discussed, one embodiment herein includes reconstructing a signal 115 at successively higher levels of quality in a hierarchy based on decoding sets of encoded data 425. The decoded data indicates how to perform upsampling and subsequent residual modifications from one tier to the next.

In accordance with such an embodiment, the decoder 440 decodes a first set of encoded data 425-1 and utilizes the first set of decoded data to produce reconstructed signal 450-1 according to a first level of quality (e.g., level J). Assume in this example that level J is the lowest level of quality and that the set of encoded data 425-1 includes appropriate data such as residual data 470-1 to produce reconstructed signal 450-1, which is the lowest level of quality in the hierarchy. This reconstructed signal 450-1 (e.g., low level of quality) provides a basis for upsampling to yet higher levels of quality in the hierarchy.

The decoder 440 then decodes second set of encoded data 425-2 for processing at level of quality J+1 in the hierarchy. Based on the decoded data from set of encoded data 425-2, the decoder 440 applies one or more operations 460-2 (e.g., upsample operations $U_{J+1}$) to the reconstructed signal 450-1 to produce reconstructed signal 451-1 at the J+1 level of quality. In this example, the reconstructed signal 451-1 (e.g., at the J+1 level of quality) is higher in quality than the reconstructed signal 450-1 at the J level of quality.

In accordance with further embodiments, to enhance the reconstructed signal at a respective level of quality, the decoder 440 can be configured to retrieve and apply residual data 470-2 from encoded data 425-2.

In an example embodiment, the decoder 440 implements multi-scale entropy decoding to enhance a reconstructed signal. For example, in such an embodiment, the decoder identifies residual data 470-2 as specified by decoded set of encoded data 425-2. By way of a non-limiting example, the decoder 440 can utilize a multi-scale entropy decoder to decode the residual data 470-2. The decoded residual data specifies how to modify specific elements of the reconstructed signal at the second level of quality. For example, the decoder 440 modifies the elements of the reconstructed signal 451-1 at the level of quality J+1 in a manner as specified by the residual data 470-2. Additional details associated with the entropy decoding and processing are discussed in related U.S. patent application Ser. No. entitled "SIGNAL PROCESSING AND INHERITANCE IN A TIERED SIGNAL QUALITY HIERARCHY," filed on the same day as the present application, the entire teachings of which are incorporated herein by this reference.

More specifically, the residual data 470-2 associated with level of quality J+1 indicates how to modify the reconstructed signal 451-1 subsequent to application of the one or more upsampling operations 460-2 (e.g., upsample operations $U_{J+1}$) as discussed above. That is, the residual data 470-2 indicates how to modify specific portions of the reconstructed signal 451-1 to produce reconstructed signal 451-2. Via further processing, the decoder 440 modifies the reconstructed signal 451-1 in a manner as specified by the residual data 470-2 to produce reconstructed signal 451-2 at level of quality J+1.

Subsequent to the processing at level of quality J+1 as discussed above, the decoder 440 then decodes set of encoded data 425-3 for processing at level of quality J+2 in the hierarchy. Based on the information in set of encoded data 425-3, the decoder 440 applies one or more operations 460-3 (e.g., upsample operations $U_{J+2}$) identified in the set of encoded data 425-3 to the reconstructed signal 451-2 at the J+1 level of quality to produce reconstructed signal 452-1 at the J+2 level of quality. In this example, the J+2 level of quality of reconstructed signal 452-1 is higher in quality than the reconstructed signal 451-2 at the J+1 level of quality.

After applying operations 460-3, the decoder 440 retrieves residual data 470-3 from encoded data 425-3. The residual data 470-3 associated with level of quality J+2 indicates how to modify the reconstructed signal 452-1 subsequent to application of the one or more upsampling operations 460-3 (e.g., upsample operations $U_{J+2}$) as discussed above. That is, the residual data 470-3 indicates how to modify specific portions of the reconstructed signal 452-1 to produce reconstructed signal 452-2. Via further processing via operation $R_{J+2}$, the decoder 440 modifies the reconstructed signal 452-1 in a manner as specified by the residual data 470-3 to produce reconstructed signal 452-2.

The decoder 440 can be configured to repeat the above processing for each of multiple levels of quality in the hierarchy. For example, for each of multiple levels of quality above the J+2 level of quality, the decoder 440 repeats steps of: decoding a next higher set of encoded data in the hierarchy above a last processed level of quality; identifying one or more upsample operations based on the contents of the next higher set of decoded data; applying the one or more upsample operations (if any) identified based on the contents of the next higher set of decoded data to reconstruct the signal at a next higher level of quality; identifying residual information and/or residual characteristics (if any) specified by the next higher set of decoded data; applying the residual information to modify the reconstructed signal at the next higher level of quality. This process can be repeated until the decoder reconstructs a replica or near replica of the signal 115.

The decoder 440 can be configured to use default upsample operations and/or residual data to reconstruct the signal at the different levels of quality if no operations and/or residual data is specified for the level of quality in the hierarchy. In one embodiment, such default values are obtained based on the operations and/or residual data that were used to reconstruct lower levels of quality of the same portions of the signal.

Note that the signal 115 can be of any suitable type of data. However, in one embodiment as mentioned, the signal 115 includes image data. In accordance with such an embodiment, the decoder 440 reconstructs the original signal 115 at yet higher resolution or higher levels of quality based on the tiered sets of encoded data to eventually reconstruct an image for playback (or to be used for other purposes). In certain cases, a lower level of quality image (e.g., a reconstructed signal at level lower than the highest possible resolution in the hierarchy) can be displayed for viewing (or used for other purposes) if it is not necessary or possible to reconstruct a version with the same resolution as the original signal 115.

In one embodiment, the decoder 440 or other suitable resource initiates display of image information on a display screen device in accordance with the reconstructed signal at the higher possible level or a selected level of quality.

Figure 5:
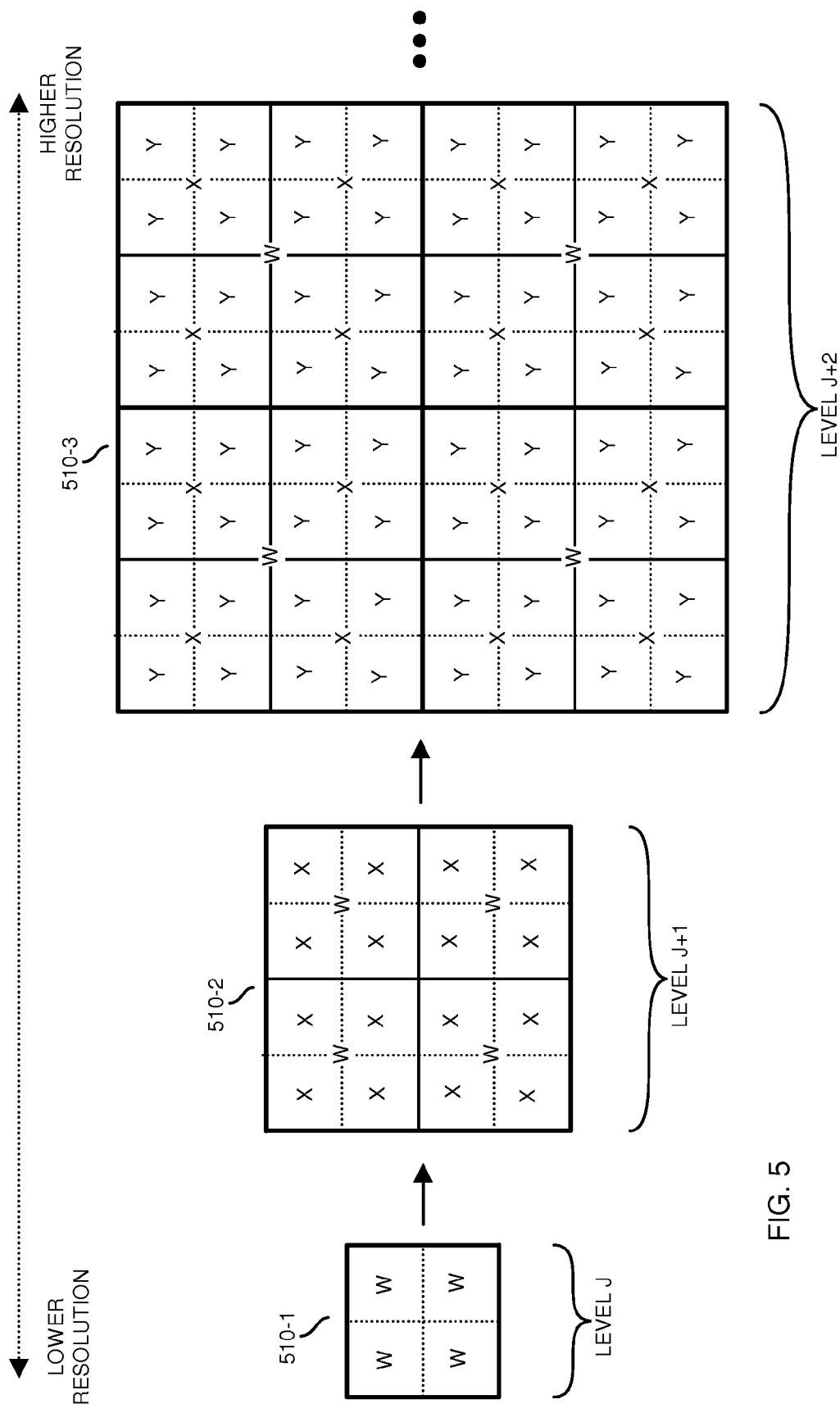
FIG. 5 is an example diagram illustrating upsampling of a lower resolution image into a higher resolution image according to embodiments herein.

FIG. 5 is an example diagram illustrating upsampling of a lower resolution image into a higher resolution image according to embodiments herein. Assume in this non-limiting example that the signal 115 and corresponding encoded data 425 indicates how to convert or expand a lower resolution image into a higher resolution image.

By way of a non-limiting example, assume that the sets of encoded data indicate how to control settings of image elements at each level of quality. For example, image 510-1 at level of quality J includes a field of image elements W; image 510-2 at level of quality J+1 includes field of image elements X; image 510-3 includes field of image elements Y; etc. Assume that reconstructed signal 450-1 specifies how to control settings of image elements W in image 510-1; reconstructed signal 451-2 specifies how to control settings of image elements X in image 510-2; reconstructed signal 452-2 specifies how to control settings of image elements Y; and so on. Thus, the decoding in FIG. 4 can be used to decode image information and produce different renditions of an original signal 115 according to different levels of quality.

Figure 6:
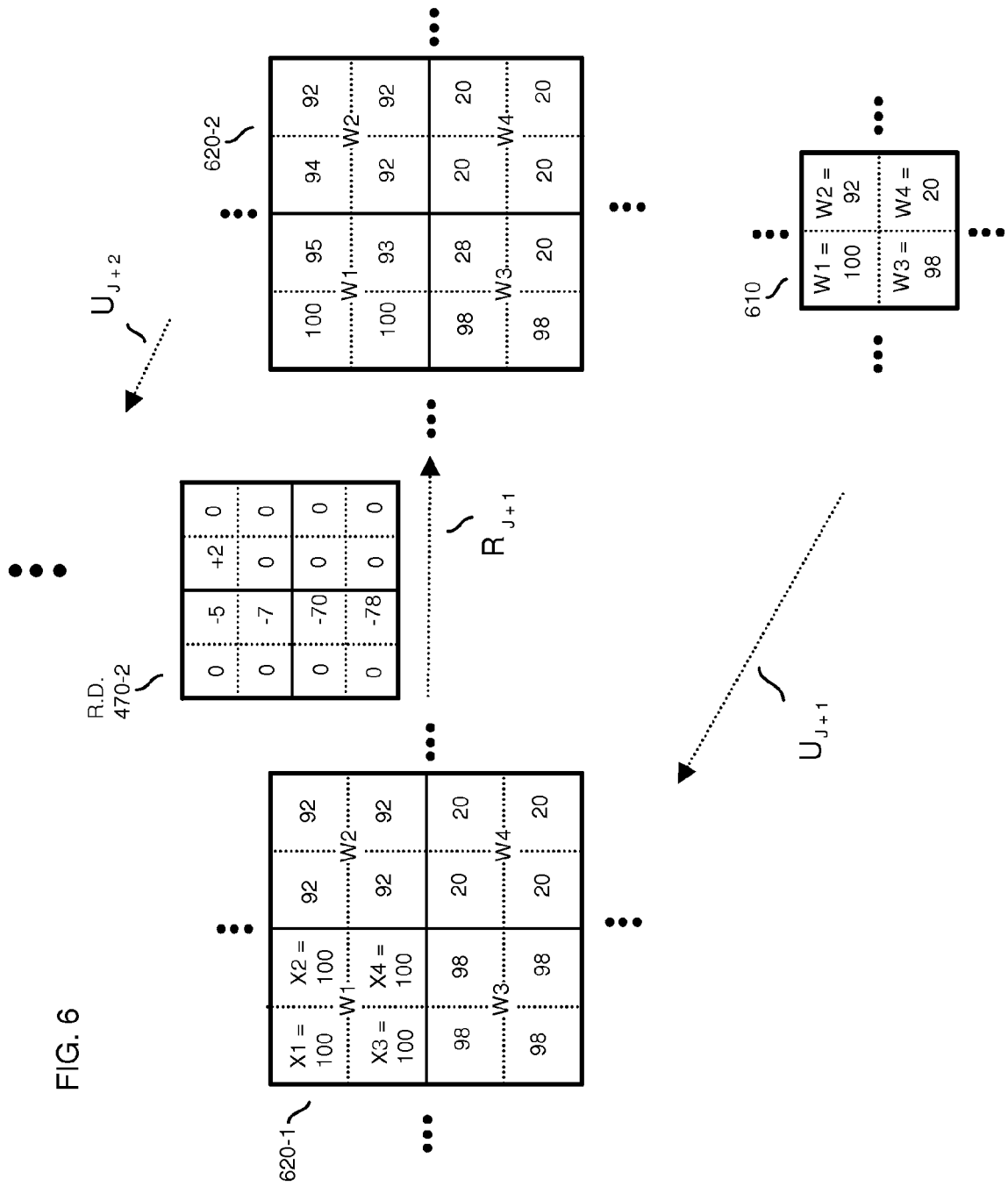
FIG. 6 is an example diagram illustrating upsampling a lower resolution image into a higher resolution image according to embodiments herein.
Figure 7:
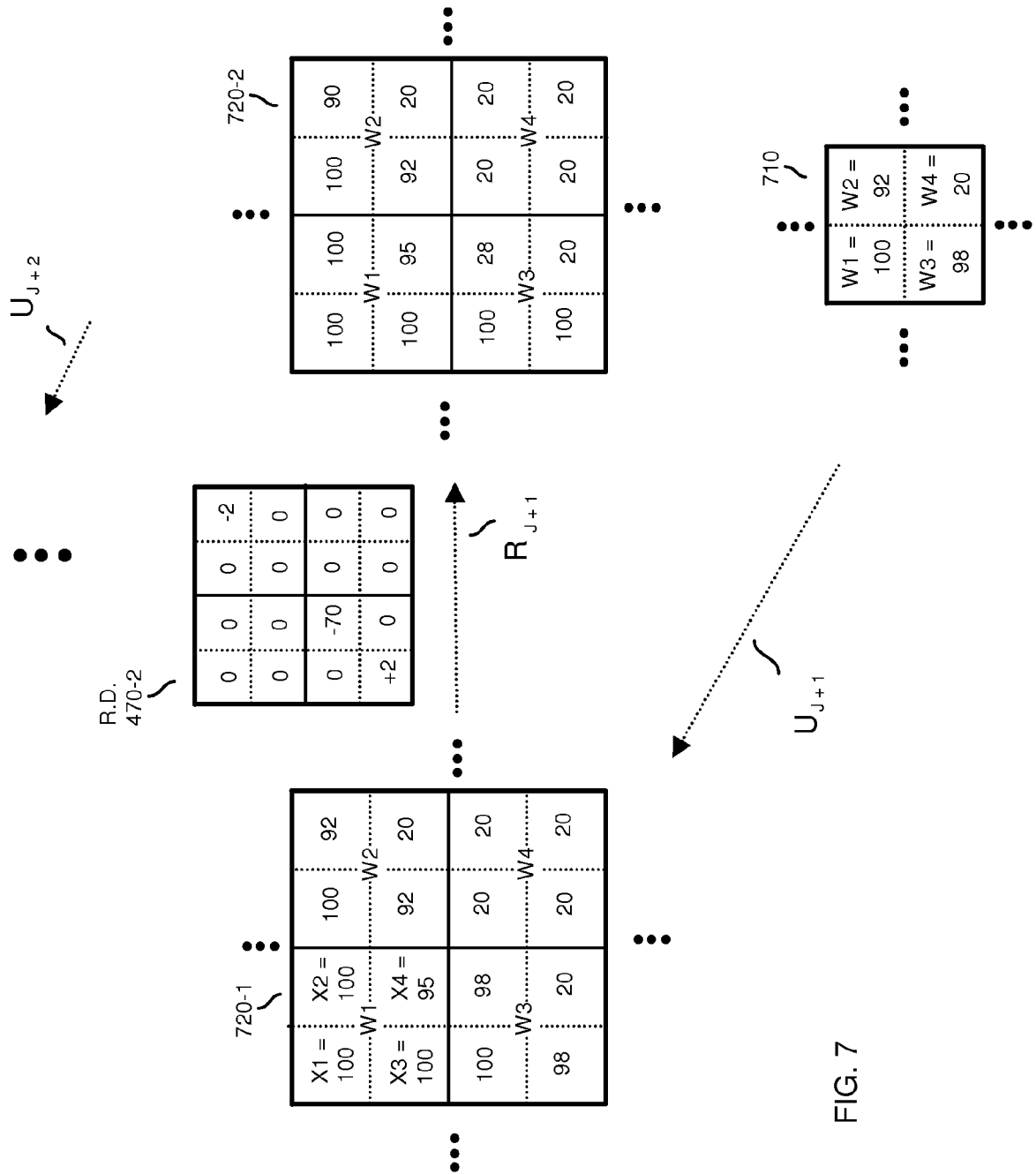
FIG. 7 is an example diagram illustrating upsampling a lower resolution image into a higher resolution image according to embodiments herein.

Following FIGS. 6 and 7 more particularly indicate how to perform upsample and apply residual data.

For example, FIG. 6 is a diagram illustrating a simple example of upsampling a lower resolution image into a higher resolution image according to embodiments herein.

In this example, assume that the set of encoded data 425-1 indicates how to produce reconstructed signal 450-1. Reconstructed signal 450-1 indicates display settings of image elements as follows: image element W1=100, image element W2=92, image element W3=98, image element W4=20. In a similar manner, reconstructed signal 451-1 derived from set of encoded data 425-2 in FIG. 4 indicates display settings of image elements in image 620-1 as shown in FIG. 6; reconstructed signal 451-2 in FIG. 4 indicates display settings of image elements in image 620-2 as shown in FIG. 6.

Thus, in this non-limiting example, image 610 is a representation of reconstructed signal 450-1; image 620-1 is a representation of reconstructed signal 451-1; image 620-2 is a representation of reconstructed signal 451-2; and so on.

As previously discussed, the operations 460-2 for level of quality J+1 indicate how to upsample at step $U_{J+1}$ in FIG. 4. In this example, assume that the upsample operations 460-2 indicate to convert image element W1 of image 610 into four image elements having the same value of 100. Thus, via application of upsampling operation by decoder 440 results in expansion of image element W1 into four image elements X1, X2, X3, and X4 of the same value. In a similar manner, each of the other image elements W2, W3, and W4 are expanded into four corresponding image elements of the same value as shown.

Note that expansion of a single image element into four image elements is shown by way of non-limiting example only and that the amount of expansion of an image element from one level of quality to the next can vary depending on the embodiment. For example, a single image element can be expanded into any number of suitable image elements (e.g., not just four image elements) when upsampling from one level of quality to the next, and a suitable filtering kernel/operation can be applied to smooth out the image instead of simply replicating the element values. Also, note that image 610, image 620-1, image 620-2, may represent only a portion of an overall set of image elements at a respective level of quality.

Via application of residual data 470-2 (e.g., matrix of difference data) in modification operation $R_{J+1}$, the decoder 440 applies the set of residual data 470-2 to modify the settings associated with image elements 620-1. For example, the decoder 440 adjusts the value of image elements in image 620-1 by adding the offset or difference values in the matrix of residual data 470-2 to the image element values in the image 620-1 to produce image 620-2 as shown.

FIG. 7 is an example diagram illustrating upsampling of a lower resolution image into a higher resolution image according to embodiments herein. However, unlike the example in FIG. 6, this example in FIG. 7 includes expanding a single image element into multiple image elements of different values depending on an applied upsample operation.

In this example, assume that the set of encoded data 425-1 indicates how to produce reconstructed signal 450-1. Reconstructed signal 450-1 indicates display settings of image elements in image 710 as follows: image element W1=100, image element W2=92, image element W3=98, image element W4=20. In a similar manner, in this example, reconstructed signal 451-1 in FIG. 4 indicates display settings of image elements in image 720-1 as shown in FIG. 7. Reconstructed signal 451-2 in FIG. 4 indicates display settings of image elements in image 720-2 as shown in FIG. 7.

Thus, in this non-limiting example, image 710 is a representation of reconstructed signal 450-1; image 720-1 is a representation of reconstructed signal 451-1; image 720-2 is a representation of reconstructed signal 451-2; and so on.

As previously discussed, the operations 460-2 for level of quality J+1 indicate how to upsample at step $U_{J+1}$ in FIG. 4. Assume that the upsample operations 460-2 in this example indicate how to convert image element W1 of image 610 into four image elements having different values. For example, execution of the operations 460-2 by decoder 440 converts the image element W1 into four different valued image elements in image 720-1: X1=100, X2=100, X3=100, and X4=95. Thus, in this example, instead of expanding the image element W1=100 into four image elements (e.g., X1, X2, X3, and X4) set to 100, the decoder 440 sets X1, X2, X3, and X4 to different values than the value of W1.

In one embodiment, the decoder 440 applies one or more operations such as a bicubic filter operation, a deblending filter, an unsharp masking filter, etc., to expand a single signal element into multiple signal elements having different display setting values. The values assigned to the expanded elements can be selected based at least in part on settings of neighboring signal elements.

As mentioned above, the values of the signal elements indicate any information such as color, hue, luminance, etc., such that a respective display device can display the image to a user.

In a similar manner, each of the other image elements W2, W3, and W4 are expanded into four corresponding image elements of the same or different value as shown in FIG. 7.

Note again that expansion of a single image element into four image elements is shown by way of non-limiting example only and that the amount of expansion of an image element from one level of quality to the next can vary depending on the embodiment. For example, a single image element can be expanded into any number of suitable image elements (e.g., not just four image elements) when upsampling from one level of quality to the next. Also, image 710, image 720-1, image 720-2, may represent only a portion of an overall set of image elements at a respective level of quality.

Subsequent to applying the one or more upsampling operation as discussed above to expand image elements, the decoder applies residual data 470-2 to image 720-1 to produce image 720-2. Using residual data 470-2 (e.g., matrix of difference data) in modification operation $R_{J+1}$, the decoder 440 applies the set of residual data 470-2 to modify the settings associated with image elements 720-1. For example, the decoder 440 adjusts the value of image elements in image 720-1 by adding the offset or difference values in the matrix of residual data 470-2 to the image element values in the image 720-1 to produce image 720-2 as shown. As mentioned above, the decoder repeats these steps at different levels of quality in the hierarchy to reconstruct signal 115.

Use of Different Upsample Operations at Different Levels of Quality

In accordance with one embodiment, the sets of encoded data can specify different upsample operations to apply at different levels to reconstruct a respective signal 115. For example, set of encoded data 425-2 may specify a first upsample such as a bicubic filter operation in which to upsample (e.g., $U_{J+2}$) from level of quality J+1 to level of quality J+2. Set of encoded data 425-3 may specify a second upsample such as a deblending filter operation in which to upsample (e.g., $U_{J+3}$) from level of quality J+2 to level of quality J+3, and so on. The ability to specify and apply different upsample operations (or combinations thereof) at each level of quality provides flexibility as the decoder 440 is not required to reconstruct a signal using only a default upsample operation.

Use of a Same One or More Upsample Operation at Multiple Levels of Quality

In accordance with another embodiment, an upsample operation specified for use at one level of quality can be used at successively higher levels of quality to reconstruct a respective signal 115. For example, the decoder 440 can be configured to apply the one or more upsample operations as specified by the set of encoded data 425-2 to reconstruct the signal 115 at level of quality J+2 as previously discussed.

The set of encoded data 425-3 (e.g., a higher level of quality) may not specify any upsample operations. In accordance with such an embodiment, the decoder 440 can be configured to reconstruct the signal 115 at higher levels of quality until a respective set of decoded data for a higher level of quality indicates to either discontinue application of the upsampling operation and/or until a set of encoded data at a higher level of quality indicates to apply a different set of one or more upsample operations.

Thus, embodiments herein can include decoding a set of encoded data at a higher level of quality. In response to identifying that the set of encoded data at the higher level of quality does not specify a particular upsample operation, the decoder 440 applies the upsample operations used at a lower level of quality to reconstruct the signal at a higher level of quality.

Use of Residual Data at Multiple Levels of Quality

In accordance with yet further embodiments, residual data specified for use at one level of quality can be used at successively higher levels of quality to reconstruct a respective signal 115 until a higher level of quality indicates to use different residual data or the higher level of quality indicates to discontinue application of the residual data. For example, the decoder 440 can retrieve residual data from a set of decoded data at a particular level of quality. As previously discussed, the residual data indicates how to modify the reconstructed signal at the particular level of quality subsequent to application of a specified upsampling operation. The decoder 440 modifies the reconstructed signal at the particular level of quality as specified by the set of encoded data. Additionally, the decoder 440 modifies a reconstructed signal at a level of quality higher than the particular level of quality.

As an example, assume that the decoder 440 identifies residual data 470-2 as specified by set of encoded data 425-2. The residual data 470-2 specifies a location of elements in the reconstructed signal at level of quality J+1 and how to modify the elements of the reconstructed signal 451-1 at the level of quality J+1. The decoder 440 modifies the elements or portions of the reconstructed signal 451-1 at the level of quality J+1 in a manner as specified by the residual data 470-2. The decoder 440 uses the residual data 470-2 also for the reconstruction of the signal 115 at higher levels of quality (e.g., J+2 and higher) until a respective set of decoded data for a higher level of quality indicates to use different residual data at the higher levels of quality.

Applying Upsample Operations to Specified Portions of a Reconstructed Signal

In accordance with yet further embodiments, each set of encoded data can specify different upsample operations that should be applied by the decoder to specific portions of the reconstructed signal. A portion of the signal is characterized by a different number of signal elements (greater than or equal to one) depending on the particular level of quality. As an example, assume that the decoder 440 processes the set of decoded data at level of quality X to identify a specific portion (e.g., as indicated by location) of the reconstructed signal at the level of quality X−1 in which to apply the upsample operation specified by the set of decoded data. The decoder 440 then applies the upsample operation to the specific portion (e.g., a portion such as less than all of the image elements if it is a reconstructed image) of the reconstructed signal at the X−1 level of quality (e.g., level of quality just below X level of quality) to reconstruct the signal at the X level of quality.

As an example, a set of encoded data for a given level of quality can specify a first operation to apply to a first portion (e.g., first region, a first type of data, etc., in the reconstructed signal) of a reconstructed signal to perform upsampling; the set of encoded data for the given level of quality also can specify a second operation to apply to a second (different) portion (e.g., a second region, a second type of data, etc., in the reconstructed signal) of the reconstructed signal; and so on.

The set of encoded data may not specify any upsample operations for specific portions of the signal. In accordance with an embodiment, for each portion of the signal, the decoder 440 can be configured to reconstruct the signal 115 at higher levels of quality until a respective set of decoded data for a higher level of quality indicates to either discontinue application of the upsampling operation and/or until a set of encoded data at a higher level of quality indicates to apply a different set of one or more upsample operations.

In accordance with further embodiments, the decoder 440 can process the sets of data at each level of quality to identify an attribute type (e.g., in-focus region, out-of-focus region, human face, text, other objects, in fast motion, still, in slow motion, etc.) of a specifically identified portion of the reconstructed signal in which to apply the upsample processing. The decoder applies specified operations to any data in the reconstructed signal of the specified attribute type. The decoder 440 may need to analyze a reconstructed signal to identify appropriate portions of the reconstructed signal in which to apply the specified one or more operations.

In one embodiment, the decoder 440 can map the attribute type specified in a set of encoded data to a set of one or more upsample operations that will be carried out on a portion of the reconstructed signal having the specified attribute type. For example, for each portion of the signal of the specific attribute type for the specified level of quality, the decoder 440 utilizes the set of one or more upsample operations defined by its attribute type as default upsample operations for the reconstruction of the immediate level of quality and subsequently higher levels of quality of that portion of the signal. The same operations can be used until a respective set of decoded data for a higher level of quality than the first level of quality specifies to use for the signal or for portions of the signal different attribute types.

Thus, as specified by set of encoded data for a given level of quality, specified operations can be applied to a specific attribute type of data for the given level of quality as well as for data at higher levels of quality having the same specified attribute type.

Use of Different Scale Factors at Different Levels of Quality

In accordance with further embodiments, the decoder 440 can be configured to decode each of the set of encoded data to identify a scale factor value (e.g., dimensions or resolution of a signal) for upsampling a respective level of quality. As its name suggests, the scale factor value can specify a resolution in which to upsample the reconstructed signal at level of quality J+1 into the reconstructed signal at the level of quality J+2. As specified by the scale factor, the decoder 440 can be configured to upsample the reconstructed signal at the level of quality J+1 into the reconstructed signal at the level of quality J+2 in lieu of performing the upsampling in accordance with a default scale factor value known to the decoder 440.

If there is no scale factor specified for a specific upsampling of the reconstructed signal from one level of quality to another, the decoder uses a predetermined default scale factor or a scale factor specified at a previous lower level of quality. In one embodiment, the decoder 440 utilizes scale factor values as specified by sets of decoded data at different levels of the hierarchy to reconstruct the signal 115 in lieu of performing upsampling in accordance with default scale factor values for the different levels of quality in the hierarchy.

The sets of encoded data can specify different scale factors for different levels of quality. For example, in one embodiment, the scale factor values for different levels of quality (either specified in the sets of encoded data at each level of quality or known by the decoder 440 as default scale factor value if no scale factor is specified in the set of encoded data) include a first scale factor value and a second scale factor value. Assume in this example that the first scale factor value specified by a set of decoded data level of quality J+1 indicates a scale factor for upsampling from level of quality J to level of quality J+1. The set of encoded data can indicate to upsample from level of quality J+1 to level of quality J+2 in a manner as previously discussed using the second scale factor. The first scale factor value is different than the second scale factor value. Thus, the decoder 440 can upsample according to different scale factors from one level to the next.

In yet a further embodiment, the decoder 440 first upsamples the signal to the resolution obtained by multiplying the resolution of the first level of quality by the first scale factor. At that point, as previously discussed, based on the second scale factor value at a higher level of quality, the decoder 440 eliminates outmost planes of the reconstructed signal (e.g., removes one or more rows or columns at the border of the image for a 2D signal) in order to reconstruct a signal at the resolution specified with the second scale factor.

Simulating Artifacts in a Reconstructed Signal

In accordance with another embodiment, the decoder 440 can be configured to decode one or more sets of encoded data to identify characteristics of effects that are to be simulated upon signal reconstruction. For example, the signal characteristics specified in a respective set of encoded data can indicate to the decoder 440 how to simulate certain effects that are to be added to a reconstructed version of the signal at a particular level of quality (e.g., such as at the highest or selected level of quality). In accordance with such an embodiment, the set of encoded data does not need to indicate the specific elements of the reconstructed signal that should be modified and the specific modifications to apply. Instead, the set of encoded data indicates an effect or enhancement to be applied to or distributed in the reconstructed signal.

As an example, the decoder 440 can be configured to decode a set of data to identify spectral characteristics associated with effects found in an original version of the residuals that represent lower priority information. Such effects can be attributes such as film grain, camera sensor noise, lower priority details of the signal, etc. The spectral characteristics in the encoded data can indicate to the decoder 440 how to simulate the effects by adding such effects to a reconstructed signal at one or more levels of quality in the hierarchy. The spectral information about adding the effects may indicate the occurrence of the effects to be simulated and a respective distribution of the effects. However, the spectral information need not indicate an actual location or the specific values of the residuals which would be needed to closely reconstruct the artifacts that are present in the original version of the signal.

In accordance with further embodiments, for each signal element, the decoder 440 utilizes the spectral characteristics as specified by the set of decoded data also to characterize simulated effects for higher levels of quality than the level of quality at which the spectral information was identified. That is, in a manner as previously discussed, for each portion of the reconstructed signal, the decoder 440 can use the characteristics of simulated residuals specified at previous levels for multiple levels of quality in the hierarchy until a respective set of decoded data for a higher level of quality specifies to use, for the reconstructed signal or for specific portions of the reconstructed signal, different spectral characteristics of simulated effects. Thus, the decoder 440 can be configured to utilize the set of spectral characteristics to modify the elements of the reconstructed signal for display at a respective higher level of quality in a manner as specified by the spectral information. In one embodiment, the decoder applies the spectral characteristics information at the level of quality in which the reconstructed signal is displayed on a display device.

Signal Reconstruction based on Multiple Reconstructed Planes of Information

In accordance with one embodiment, the decoder 440 receives separate signal hierarchies for the different color planes of the signal (e.g., Red Green Blue, YUV, HSV or other types of color spaces). The separate signal hierarchies can feature independent (and potentially different) scale factors, operations and highest levels of quality. When the different reconstructed color planes feature different levels of quality, the decoder upsamples the lower-resolution color planes in order for them to match the resolution of the color plane with the highest level of quality, and subsequently joins all the reconstructed color planes into a reconstructed color signal to send to the display device.

Upsampling can therefore include reconstructing 3 or more planes of information for each level of quality in the hierarchy. A combination of the plane information at a respective level of quality defines an image or reconstructed signal for the respective level of quality.

In an example embodiment, the decoder 440 can reconstruct three planes at each level of quality. One plane can represent luminance (e.g., Y in the YUV standard) associated with image elements; another plane can represent blue chrominance (e.g., U in the YUV standard) associated with image elements; and another plane can represent red chrominance (e.g., V in the YUV standard) associated with image elements. Each plane can be encoded according to different levels of quality. For example, the luminance plane, which is the most important one when viewing a respective image, can be encoded with the highest level of detail; the chrominance planes can be encoded with a lower level of detail because they are less important when viewing a respective image.

Figure 8:
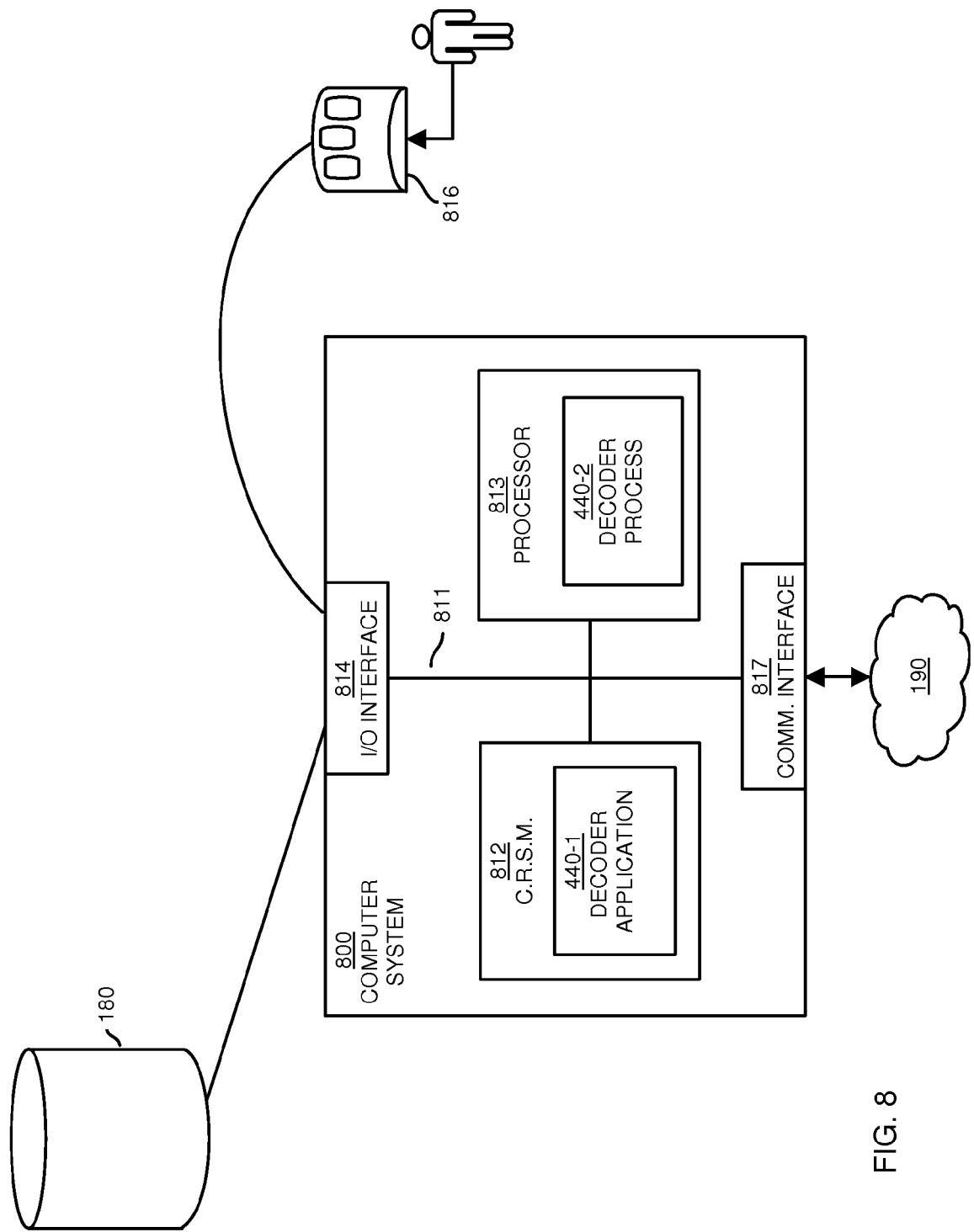
FIG. 8 is a diagram illustrating an example computer architecture for executing computer code, firmware, software, applications, logic, etc., according to embodiments herein.

FIG. 8 is an example block diagram of a computer system 800 that provides computer processing according to embodiments herein.

Computer system 800 can be or include a computerized device such as a personal computer, processing circuitry, workstation, portable computing device, console, network terminal, processing device, network device, operating as a switch, router, server, client, etc.

Note that the following discussion provides a basic embodiment indicating how to carry out functionality associated with decoder 440 as previously discussed. However, it should be noted that the actual configuration for carrying out the operations as described herein can vary depending on a respective application.

As shown, computer system 800 of the present example includes an interconnect 811 that couples computer readable storage media 812 such as a non-transitory type of media, computer readable, hardware storage medium, etc., in which digital information can be stored and retrieved. Computer system 800 can further include a processor 813, I/O interface 814, and a communications interface 817.

I/O interface 814 provides connectivity to repository 180, and if present, display screen, peripheral devices 816 such as a keyboard, a computer mouse, etc.

Computer readable storage medium 812 (e.g., a hardware storage media) can be any suitable device and/or hardware such as memory, optical storage, hard drive, floppy disk, etc. The computer readable storage medium can be a non-transitory storage media to store instructions associated with decoder application 440-1. The instructions are executed by a respective resource such as decoder 440 to perform any of the operations as discussed herein.

Communications interface 817 enables computer system 800 to communicate over network 190 to retrieve information from remote sources and communicate with other computers, switches, clients, servers, etc. I/O interface 814 also enables processor 813 to retrieve or attempt retrieval of stored information from repository 180.

As shown, computer readable storage media 812 can be encoded with decoder application 840-1 executed by processor 813 as switch resource process 840-2.

Note that the computer system 800 or decoder 440 also can be embodied to include a computer readable storage medium 812 (e.g., a hardware storage media, non-transitory storage media, etc.) for storing data and/or logic instructions.

Computer system 800 can include a processor 813 to execute such instructions and carry out operations as discussed herein. Accordingly, when executed, the code associated with decoder application 440-1 can support processing functionality as discussed herein.

During operation of one embodiment, processor 813 accesses computer readable storage media 812 via the use of interconnect 811 in order to launch, run, execute, interpret or otherwise perform the instructions of decoder application 440-1 stored in computer readable storage medium 812. Execution of the decoder application 440-1 produces processing functionality in processor 813. In other words, the decoder process 440-2 associated with processor 813 represents one or more aspects of executing decoder application 440-1 within or upon the processor 813 in the computer system 800.

Those skilled in the art will understand that the computer system 800 can include other processes and/or software and hardware components, such as an operating system that controls allocation and use of hardware processing resources to execute decoder application 440-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Functionality supported by components in decoder 440 will now be discussed via flowcharts in FIGS. 9-11. As discussed above, the decoder application 440-1 executed by a respective switch and/or other hardware can be configured to execute the steps in the flowcharts as discussed below.

Note that there will be some overlap with respect to concepts discussed above for FIGS. 1 through 8. Also, note that the steps in the flowcharts need not always be executed in the order shown. The steps can be executed in any suitable order.

Figure 9:
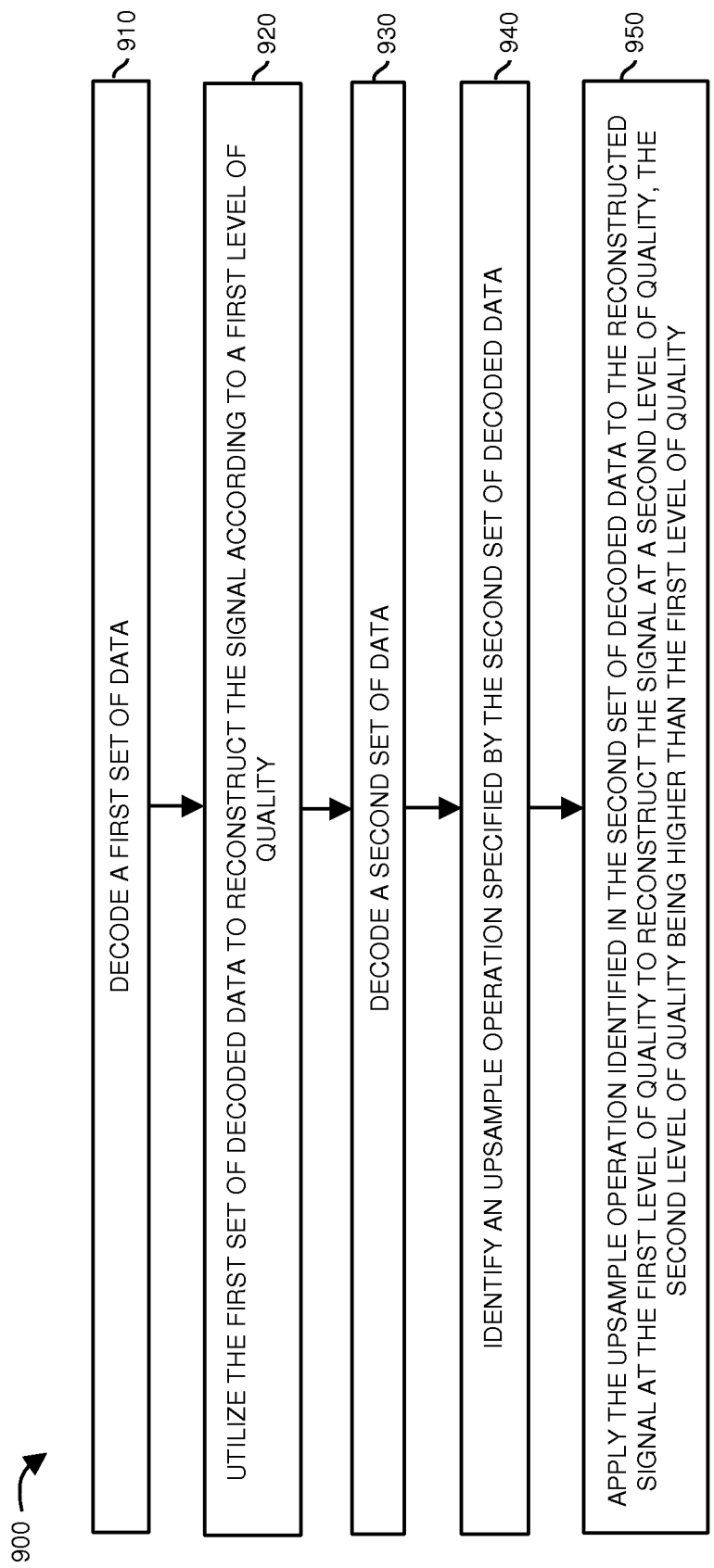
FIG. 9 is a flowchart illustrating an example method of reconstructing a signal according to embodiments herein.

FIG. 9 is a flowchart 900 illustrating a method of reconstructing a signal at different levels of quality according to embodiments herein.

In step 910, the decoder 440 decodes a first set of data.

In step 920, the decoder 440 utilizes the first set of decoded data to reconstruct the signal 115 according to a first level of quality.

In step 930, the decoder 440 decodes a second set of data.

In step 940, the decoder 440 identifies an upsample operation specified by the second set of decoded data.

In step 950, the decoder 440 applies the upsample operation identified in the second set of decoded data to the reconstructed signal at the first level of quality to reconstruct the signal at a second level of quality.

Figure 10:
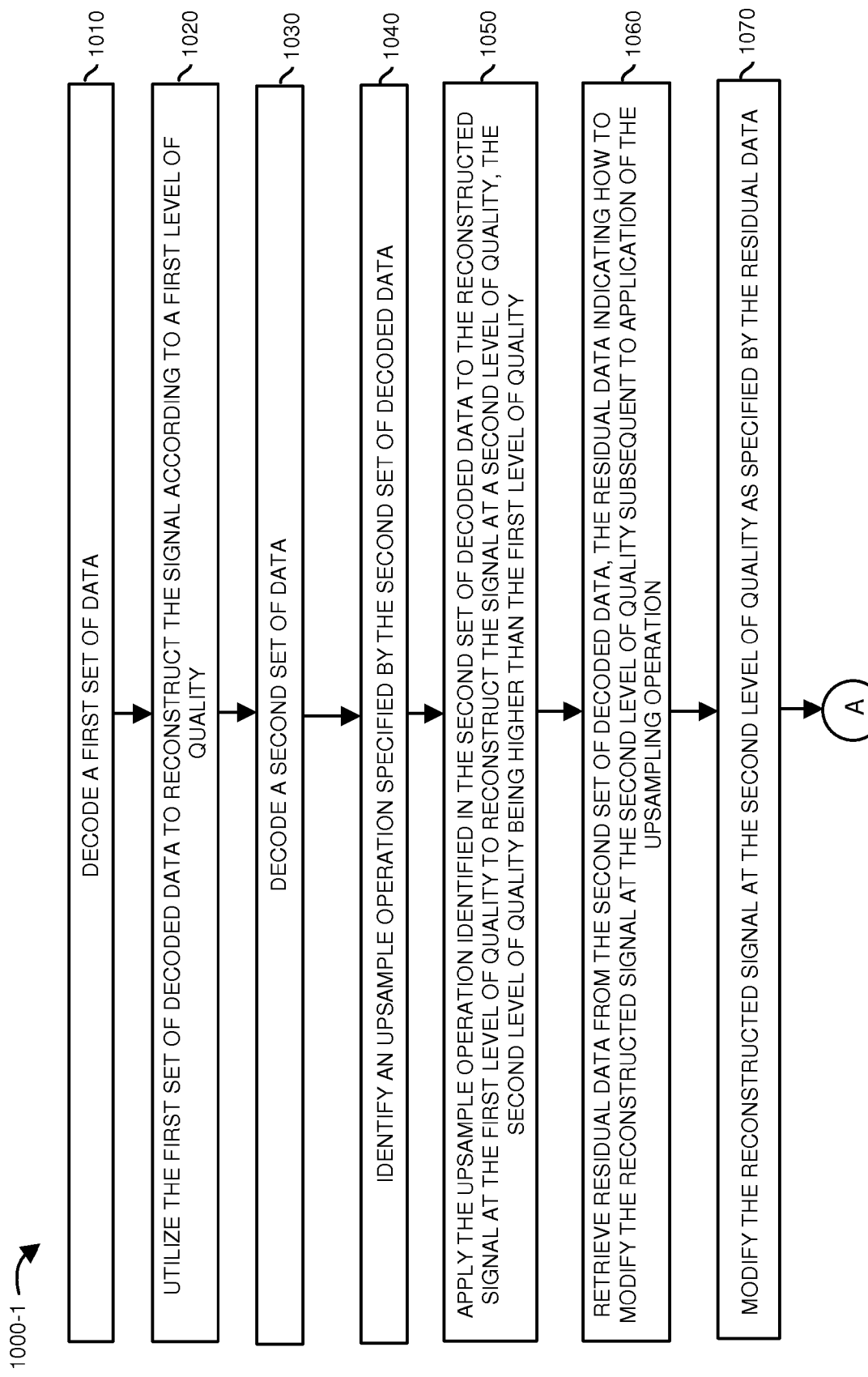
FIGS. 10 and 11 combine to form a flowchart illustrating a more specific example method of reconstructing a signal according to embodiments herein.
Figure 11:
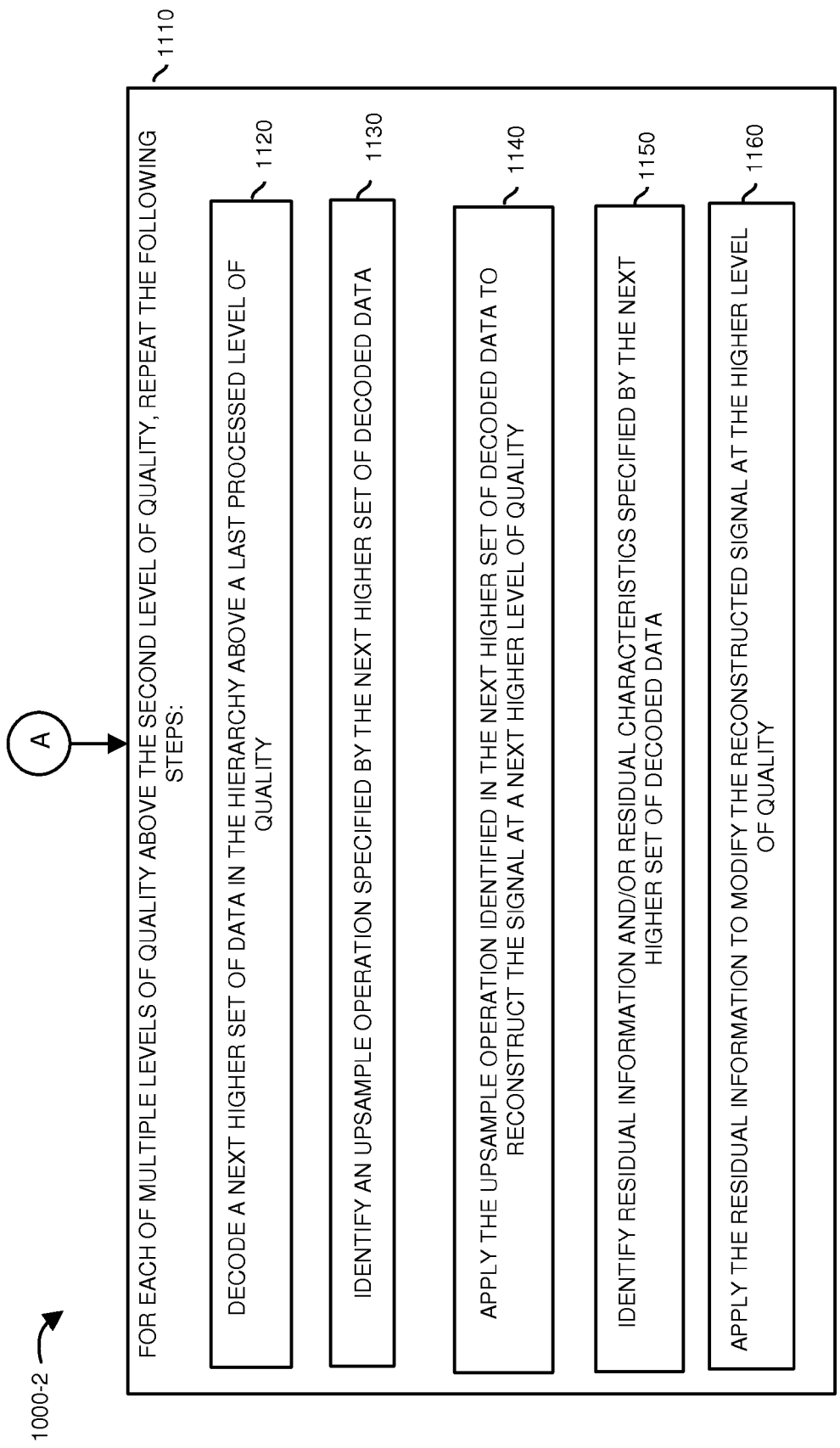

FIGS. 10 and 11 combine to form a flowchart 1000 (e.g., flowchart 1000-1 and flowchart 1000-2) illustrating decoding according to embodiments herein.

In step 1010, the decoder 440 decodes a first set of data

In step 1020, the decoder 440 utilizes the first set of decoded data to reconstruct the signal 115 according to a first level of quality In step 1030, the decoder 440 decodes a second set of data In step 1040, the decoder 440 identifies an upsample operation and scale factor specified by the second set of decoded data.

In step 1050, the decoder 440 applies the upsample operation and scale factor identified in the second set of decoded data to the reconstructed signal at the first level of quality to reconstruct the signal 115 at a second level of quality.

In step 1060, the decoder 440 retrieves residual data from the second set of decoded data. The residual data indicates how to modify the reconstructed signal at the second level of quality subsequent to application of the upsampling operation.

In step 1070, the decoder 440 modifies the reconstructed signal at the second level of quality as specified by the residual data.

In step 1110, for each of multiple levels of quality above the second level of quality in the hierarchy, the decoder 440 repeats the following steps:

In sub-step 1120, the decoder 440 decodes a next higher set of data in the hierarchy above a last processed level of quality.

In sub-step 1130, the decoder 440 identifies an upsample operation and scale factor specified by the next higher set of decoded data.

In sub-step 1140, the decoder 440 applies the upsample operation and scale factor identified in the next higher set of decoded data to reconstruct the signal 115 at a next higher level of quality.

In sub-step 1150, the decoder 440 identifies residual information and/or residual characteristics specified by the next higher set of decoded data.

In sub-step 1160, the decoder 440 applies the residual information to modify the reconstructed signal at the higher level of quality.

Note again that techniques herein are well suited for use in processing and reconstructing signals using a decoder. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of reconstructing a signal at successively higher levels of quality in a hierarchy, the method comprising:
   decoding a first set of data;
   utilizing the decoded first set of data to reconstruct the signal according to a first level of quality;
   decoding a second set of data;
   identifying an upsample operation specified by the decoded second set of data;
   applying the upsample operation identified in the decoded second set of data to the reconstructed signal at the first level of quality to reconstruct the signal at a second level of quality, the second level of quality being higher than the first level of quality;
   decoding a third set of data;
   identifying an upsample operation specified by the decoded third set of data; and
   applying the upsample operation identified in the decoded third set of data to the reconstructed signal at the second level of quality to reconstruct the signal at a third level of quality, the third level of quality being higher than the second level of quality in the hierarchy.

2. The method as in claim 1, wherein the upsample operation identified in the decoded second set of data is a first upsample operation; and
   wherein the upsample operation identified in the decoded third set of data is a second upsample operation, the first upsample operation being different from the second upsample operation.

3. The method as in claim 1, wherein the upsample operation applied to the reconstructed signal at the first level of quality includes at least one operation selected from the group consisting of:
   i) a bicubic filter operation,
   ii) a deblending filter, and
   iii) an unsharp masking operation.

4. The method as in claim 1 further comprising:
   from the decoded second set of data, producing a first subset of upsample operation data corresponding to a first portion of the signal, wherein the first subset of upsample operation data specifies a first upsample operation to apply to the signal at the first level of quality in order to produce a preliminary rendition of the first portion of the signal at the second level of quality; and
   from the decoded second set of data, producing a second subset of upsample operation data corresponding to a second portion of the signal, wherein the second subset of upsample operation data specifies a second upsample operation to apply to the signal at the first level of quality in order to produce a preliminary rendition for the second portion of the signal at the second level of quality.

5. The method as in claim 4 further comprising:
   applying the first upsample operation to the reconstructed signal at the second level of quality to reconstruct a rendition of the first portion of the signal at the third level of quality; and from the third set of decoded data, decoding a third subset of upsample operation data corresponding to the second portion of the signal, wherein the third subset of upsample operation data specifies a third upsample operation to apply to the signal at the second level of quality in order to produce a preliminary rendition of the second portion of the signal at the third level of quality.

6. The method as in claim 1 further comprising:
in response to identifying from the second set of decoded data that a particular upsample operation specified for use in one level of quality is to be used at successively higher levels of quality to reconstruct a respective portion of the signal, applying the particular upsample operation identified in the second set of decoded data to the reconstructed signal at the successively higher levels of quality.

7. The method as in claim 1 further comprising:
retrieving residual data from the decoded second set of data, the residual data indicating how to modify a preliminary rendition of the reconstructed signal at the second level of quality subsequent to application of the upsampling operation;
modifying the preliminary rendition of the reconstructed signal at the second level of quality as specified by the residual data; and
modifying, as specified by the residual data retrieved from the second set of decoded data, a rendition of the reconstructed signal at a level of quality higher than the second level of quality.

8. The method as in claim 7 further comprising:
identifying residual data as specified by the decoded second set of data; and
modifying the elements of the reconstructed signal at the second level of quality in a manner as specified by the residual data; and
using the residual data as specified by the decoded second set of data also for the reconstruction of higher levels of quality than the second level of quality until a respective decoded set of data for a higher level of quality than the second level of quality specifies to use different residual data.

9. The method as in claim 1 further comprising:
processing the decoded second set of data to identify a first upsample operation to apply to a specific portion of the reconstructed signal at the first level of quality; and
applying the first upsample operation to the specific portion of the reconstructed signal at the first level of quality to reconstruct the signal at the second level of quality.

10. The method as in claim 1 further comprising:
processing the decoded second set of data to identify an attribute type of a specifically identified portion of the reconstructed signal at the first level of quality;
mapping the attribute type to a set of at least one upsample operation, the set of at least one upsample operation configured to process a type of data in the signal as specified by the attribute type; and
for each portion of the signal, utilizing the set of at least one upsample operation defined by its attribute type as default upsample operations for the reconstruction of subsequent levels of quality of that portion of the signal, until a respective set of decoded data for a higher level of quality than the first level of quality specifies to use for the signal or for portions of the signal different attribute types.

11. The method as in claim 1 further comprising:
applying different upsample operations identified in the decoded second set of data to different portions of the reconstructed signal at the first level of quality to reconstruct the signal at the second level of quality; and
for each portion of the signal, utilizing the set of at least one upsample operation identified in the decoded second set of data as default upsample operations for the reconstruction of subsequent levels of quality of that portion of the signal, until a respective decoded set of data for a higher level of quality than the first level of quality specifies to use for the signal or for portions of the signal different upsample operations.

12. The method as in claim 1 further comprising:
processing the decoded second set of data to identify a scale factor value, the scale factor value indicating the resolution in which to upsample the reconstructed signal at the first level of quality into the reconstructed signal at the second level of quality; and
in accordance with the scale factor, upsampling the reconstructed signal at the first level of quality into the reconstructed signal at the second level of quality, in lieu of performing the upsampling in accordance with a default scale factor value.

13. The method as in claim 1 further comprising:
utilizing scale factor values as specified by decoded sets of data at different levels of the hierarchy to reconstruct the signal in lieu of performing upsampling in accordance with default scale factor values for the different levels of quality in the hierarchy.

14. The method as in claim 13, wherein the scale factor values include a first scale factor value and second scale factor value, the first scale factor value specified by the first set of decoded data and the second scale factor value specified by the second set of decoded data, the first scale factor value being different than the second scale factor value, the method further comprising:
utilizing the first scale factor value to upsample and reconstruct the signal at the resolution indicated by the first scale factor and by the resolution of the first level of quality; and
utilizing the second scale factor value to reconstruct the signal at the second level of quality.

15. The method as in claim 1 further comprising:
decoding the second set of data to identify characteristics of simulated residuals, the characteristics indicating to a decoder how to simulate residuals to be added to the reconstructed signal, the characteristics not indicating the specific elements of the reconstructed signal that should be modified and the specific modifications to apply; and
for each signal element, using the characteristics of simulated residuals data as specified by the decoded second set of data also to characterize simulated residuals for higher levels of quality than the second level of quality of the signal elements co-located with that signal element, until a respective set of decoded data for a higher level of quality than the second level of quality specifies to use for the signal or for portions of the signal different characteristics of simulated residuals; and
utilizing the set of characteristics to modify the elements of the reconstructed signal at the displayed level of quality in a manner as specified by the simulated residual data.

16. The method as in claim 1 further comprising:
decoding the second set of data to identify spectral characteristics associated with residuals that represent lower priority information, the spectral characteristics indicating to the decoder how to simulate the residuals to apply to the reconstructed signal, the spectral characteristics not indicating the actual location or specific values of the residuals; and for each signal element, utilizing the spectral characteristics as specified by the second set of decoded data also to characterize simulated residuals for higher levels of quality than the second level of quality of the portion of the signal co-located with that signal element, until a respective set of decoded data for a higher level of quality than the second level of quality specifies to use for the signal or for specific portions of the signal different spectral characteristics of simulated residuals; and utilizing the set of spectral characteristics to modify the elements of the reconstructed signal at the displayed level of quality in a manner as specified by the simulated residual data.

17. The method as in claim 1, wherein the hierarchy includes an additional set of data to reconstruct the signal according to a subsequent level of quality in the hierarchy, the subsequent level of quality being higher than a current level of quality in the hierarchy, the method further comprising:

displaying image information on a display device in accordance with the reconstructed signal at the current level of quality.

18. The method as in claim 1 further comprising:

for each of multiple levels of quality above the third level of quality, repeating steps of:
 decoding a next higher set of data in the hierarchy above a last processed level of quality;
 identifying an upsample operation and/or scale factor specified by the next higher set of decoded data;
 applying the upsample operation identified in the next higher set of decoded data to reconstruct the signal at a next higher level of quality;
 identifying residual information and/or residual characteristics specified by the next higher set of decoded data; and
 applying the residual information to modify the reconstructed signal at the higher level of quality.

19. The method as in claim 1 wherein:

a decoder receives separate signal hierarchies for the different color planes of the signal, the separate signal hierarchies featuring independent scale factors, operations and highest levels of quality;

the decoder upsamples a lower resolution color plane based on a different color plane with a higher level of quality in order for the lower resolution color plane to match a resolution of a color plane at a higher level of quality; and the decoder combines all of the reconstructed color planes into a reconstructed color signal to send to a display device.

20. The method as in claim 1 wherein:

decoding separate received signal hierarchies for different color planes associated with the signal, the separate received signal hierarchies featuring independent and potentially different scale factors, operations and highest levels of quality; and when different reconstructed color planes feature different levels of quality, upsampling the lower-resolution color planes to match the resolution of the color plane with the highest level of quality, and subsequently joining the reconstructed color planes into a reconstructed color signal to send to a display device.

21. The method as in claim 1 wherein reconstructing the signal at the second level of quality further comprises:

applying the upsample operation specified by the decoded second set of data to the reconstructed signal at the second level of quality to reconstruct a preliminary rendition of the signal at the second level of quality;

identifying residual data specified by the decoded second set of data; and combining the residual data and the preliminary rendition of the signal at the second level of quality to reconstruct a rendition of the signal at the second level of quality.

22. The method as in claim 1, wherein the upsample operation identified in the decoded second set of data is a first upsample operation derived from first upsample operation data specified by the second set of decoded data;

wherein the upsample operation identified in the third set of decoded data is a second upsample operation derived from second upsample operation data specified by the decoded third set of data; and wherein the second upsample operation includes upsample kernel data that is different from each of multiple sets of upsample kernel data used by the upsample operation specified by the decoded second set of data.

23. The method as in claim 1, wherein the upsample operation specified by the decoded third set of data is based at least in part on the upsample operation specified by the decoded second set of data.

24. The method as in claim 1, wherein the upsample operation data is decoded by means of a tier based decoding method, the method comprising:

decoding upsample operation data at the first level of quality;

based on the decoded upsample operation data at the first level of quality, producing a preliminary rendition of upsample operation data at a second level of quality;

decoding a set of upsample operation adjustments; and combining upsample operation adjustments with the preliminary rendition of upsample operation data at the second level of quality to produce upsample operation data at the second level of quality.

25. The method as in claim 1, wherein the signal is a three-dimensional signal and the upsample operation specified by the decoded second set of data indicates to upsample the signal along three dimensions.

26. The method as in claim 25, wherein the signal is a video signal and the upsample operation as specified by the decoded second set of data indicates to upsample the signal along both spatial and time dimensions.

27. A method of reconstructing a signal at successively higher levels of quality in a hierarchy, the method comprising:

decoding a first set of data;

utilizing the decoded first set of data to reconstruct the signal according to a first level of quality;

decoding a second set of data;

identifying an upsample operation specified by the decoded second set of data;

applying the upsample operation identified in the decoded second set of data to the reconstructed signal at the first level of quality to reconstruct the signal at a second level of quality, the second level of quality being higher than the first level of quality;

identifying residual data as specified by the decoded second set of data;

utilizing an entropy decoder to decode the residual data, the decoded residual data specifying how to modify specific elements of the reconstructed signal at the second level of quality; and modifying the elements of the reconstructed signal at the second level of quality in a manner as specified by the decoded residual data.

28. A computer system comprising:
   processor hardware;
   a storage unit that stores instructions associated with an application executed by the processor hardware; and
   an interconnect coupling the processor hardware and the storage unit, causing the processor hardware to execute the application and perform operations of:
      decoding a first set of data;
      utilizing the decoded first set of data to reconstruct the signal according to a first level of quality;
      decoding a second set of data;
      identifying an upsample operation specified by the decoded second set of data;
      applying the upsample operation identified in the decoded second set of data to the reconstructed signal at the first level of quality to reconstruct the signal at a second level of quality, the second level of quality being higher than the first level of quality;
      decoding a third set of data;
      identifying an upsample operation specified by the decoded third set of data; and
      applying the upsample operation identified in the decoded third set of data to the reconstructed signal at the second level of quality to reconstruct the signal at a third level of quality, the third level of quality being higher than the second level of quality in the hierarchy.

29. A computer-readable hardware storage hardware having instructions stored thereon, the instructions, when carried out by processing hardware, causes the processing hardware to perform operations of:
   decoding a first set of data;
   utilizing the decoded first set of data to reconstruct the signal according to a first level of quality;
   decoding a second set of data;
   identifying an upsample operation specified by the decoded second set of data;
   applying the upsample operation identified in the decoded second set of data to the reconstructed signal at the first level of quality to reconstruct the signal at a second level of quality, the second level of quality being higher than the first level of quality;
   decoding a third set of data;
   identifying an upsample operation specified by the decoded third set of data; and
   applying the upsample operation identified in the decoded third set of data to the reconstructed signal at the second level of quality to reconstruct the signal at a third level of quality, the third level of quality being higher than the second level of quality in the hierarchy.

30. A method of reconstructing a signal at successively higher levels of quality in a hierarchy, the method comprising:
   decoding a first set of data;
   utilizing the first set of decoded data to reconstruct the signal according to a first level of quality;
   decoding a second set of data, the second set of data produced by an encoder to reconstruct the signal at a second level of quality;
   identifying an upsample operation as specified by a decoded data subset of the second set of data; and
   applying the identified upsample operation to the reconstructed signal at the first level of quality to reconstruct a preliminary rendition of the signal at the second level of quality, the second level of quality being higher than the first level of quality;
   processing the decoded second set of data to produce residual data for the rendition of the signal at the second level of quality, the residual data indicating how to modify the preliminary rendition of the signal at the second level of quality; and
   modifying the reconstructed preliminary rendition of the signal at the second level of quality using the residual data.

31. The method as in claim 30, wherein the upsample operation comprises a first upsample kernel for reconstruction of a first portion of the signal at the second level of quality and a second upsample kernel for reconstruction of a second portion of the signal at the second level of quality, the first upsample kernel being different from the second upsample kernel; and
   wherein parameters of the first upsample kernel and of the second upsample kernel are specified by the decoded data subset of the second set of data.

32. The method as in claim 30 further comprising:
   decoding a third set of data;
   identifying an upsample operation specified by the decoded third set of data; and
   applying the upsample operation identified in the decoded third set of data to the reconstructed signal at the second level of quality to reconstruct a preliminary rendition of the signal at a third level of quality, the third level of quality being higher than the second level of quality in the hierarchy.

33. The method as in claim 30, wherein processing the decoded second set of data to produce residual data comprises:
   simultaneously processing subsets of the decoded second set of data in parallel to retrieve residual data from the decoded second set of data; and
   modifying the reconstructed preliminary rendition of the signal at the second level of quality as specified by the residual data.

34. The method as in claim 30, wherein the upsample operation is specified by the decoded data from a set of substantially unlimited possible upsample operations.

35. The method as in claim 30, wherein the encoder, during encoding of the signal, produces the second set of data to specify the upsample operation to reconstruct the preliminary rendition of the signal at the second level of quality.

36. The method as in claim 30, wherein the encoder produces the upsample operation to reduce an entropy of the residual data to be applied to the preliminary rendition of the signal at the second level of quality.

37. The method as in claim 30, wherein the encoder downsamples the signal during encoding to identify the upsample operation to be included in the second set of data to reconstruct the preliminary rendition of the signal at the second level of quality.

38. A computer system comprising:
   processor hardware;
   a storage unit that stores instructions associated with an application executed by the processor hardware; and
   an interconnect coupling the processor hardware and the storage unit, causing the computer system to execute the instructions and perform operations of:
      decoding a first set of data;
      utilizing the decoded first set of data to reconstruct the signal according to a first level of quality;
      decoding a second set of data;

identifying an upsample operation specified by the decoded second set of data;

applying the upsample operation identified in the decoded second set of data to the reconstructed signal at the first level of quality to reconstruct the signal at a second level of quality, the second level of quality being higher than the first level of quality;

identifying residual data as specified by decoded second set of data;

utilizing an entropy decoder to decode the residual data, the decoded residual data specifying how to modify specific elements of the reconstructed signal at the second level of quality; and modifying the elements of the reconstructed signal at the second level of quality in a manner as specified by the decoded residual data.

39. A computer-readable hardware storage hardware having instructions stored thereon, the instructions, when carried out by a processing device, causes the processing device to perform operations of:

decoding a first set of data;

utilizing the decoded first set of data to reconstruct the signal according to a first level of quality;

decoding a second set of data;

identifying an upsample operation specified by the decoded second set of data;

applying the upsample operation identified in the decoded second set of data to the reconstructed signal at the first level of quality to reconstruct the signal at a second level of quality, the second level of quality being higher than the first level of quality;

identifying residual data as specified by decoded second set of data;

utilizing an entropy decoder to decode the residual data, the decoded residual data specifying how to modify specific elements of the reconstructed signal at the second level of quality; and modifying the elements of the reconstructed signal at the second level of quality in a manner as specified by the decoded residual data.

40. A method of reconstructing a signal at successively higher levels of quality in a hierarchy, the method comprising:

decoding a first set of data;

utilizing the first set of decoded data to reconstruct the signal according to a first level of quality;

decoding a second set of data, the second set of data produced by an encoder to reconstruct the signal at a second level of quality, the encoder, during encoding of the signal, producing the second set of data to specify an upsample operation to reconstruct a preliminary rendition of the signal at the second level of quality, the encoder producing the upsample operation to reduce an entropy of residual data to be applied to the preliminary rendition of the signal at the second level of quality;

identifying the upsample operation as specified by a decoded data subset of the second set of data; and applying the identified upsample operation to the reconstructed signal at the first level of quality to reconstruct the preliminary rendition of the signal at the second level of quality, the second level of quality being higher than the first level of quality.

41. A computer system comprising:

processor hardware;

a storage unit that stores instructions associated with an application executed by the processor hardware; and an interconnect coupling the processor hardware and the storage unit, causing the processor hardware to execute the instructions and perform operations of:

decoding a first set of data;

utilizing the first set of decoded data to reconstruct the signal according to a first level of quality;

decoding a second set of data, the second set of data produced by an encoder to reconstruct the signal at a second level of quality;

identifying an upsample operation as specified by a decoded data subset of the second set of data;

applying the identified upsample operation to the reconstructed signal at the first level of quality to reconstruct a preliminary rendition of the signal at the second level of quality, the second level of quality being higher than the first level of quality;

wherein the encoder, during encoding of the signal, produced the second set of data to specify the upsample operation to reconstruct the preliminary rendition of the signal at the second level of quality;

wherein the encoder, during encoding of the signal, produced the upsample operation to reduce an entropy of residual data to be applied to the preliminary rendition of the signal at the second level of quality.

42. A computer system comprising:

processor hardware;

a storage unit that stores instructions associated with an application executed by the processor hardware; and an interconnect coupling the processor hardware and the storage unit, causing the processor hardware to execute the instructions and perform operations of:

decoding a first set of data;

utilizing the first set of decoded data to reconstruct the signal according to a first level of quality;

decoding a second set of data, the second set of data produced by an encoder to reconstruct the signal at a second level of quality;

identifying an upsample operation as specified by a decoded data subset of the second set of data; and applying the identified upsample operation to the reconstructed signal at the first level of quality to reconstruct a preliminary rendition of the signal at the second level of quality, the second level of quality being higher than the first level of quality;

processing the decoded second set of data to produce residual data for the rendition of the signal at the second level of quality, the residual data indicating how to modify the preliminary rendition of the signal at the second level of quality; and modifying the reconstructed preliminary rendition of the signal at the second level of quality using the residual data.

* * * * *